(12) United States Patent  
Momose et al.

(10) Patent No.: US 9,204,136 B2  
(45) Date of Patent: Dec. 1, 2015

(54) DISPLAY DEVICE AND ELECTRONIC APPARATUS

(71) Applicant: SEIKO EPSON CORPORATION, Tokyo (JP)

(72) Inventors: Yoichi Momose, Matsumoto (JP); Nobutaka Urano, Chino (JP); Junichi Taira, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 197 days.

(21) Appl. No.: 13/950,885

(22) Filed: Jul. 25, 2013

(65) Prior Publication Data

US 2014/0035802 A1    Feb. 6, 2014

(30) Foreign Application Priority Data

Aug. 1, 2012    (JP) .................... 2012-170878

(51) Int. Cl.
*H04N 13/04* (2006.01)
*G09G 3/34* (2006.01)
*G09G 3/36* (2006.01)
*H04N 13/00* (2006.01)

(52) U.S. Cl.
CPC ......... *H04N 13/0452* (2013.01); *G09G 3/3406* (2013.01); *G09G 3/36* (2013.01); *H04N 13/00* (2013.01); *H04N 13/0429* (2013.01); *H04N 13/0434* (2013.01); *H04N 13/0438* (2013.01); *H04N 13/0454* (2013.01); *G09G 2320/0209* (2013.01); *G09G 2320/0233* (2013.01); *G09G 2320/04* (2013.01); *G09G 2320/062* (2013.01); *G09G 2320/0646* (2013.01)

(58) Field of Classification Search
CPC ................ G09G 3/34; G09G 3/3406–3/3426; G09G 2320/0209; G09G 2320/0233; G09G 2320/04; G09G 2320/062; G09G 2320/0646; H04N 13/04; H04N 13/0429; H04N 13/0434; H04N 13/0438; H04N 13/0452; H04N 13/0454

See application file for complete search history.

(56) References Cited

U.S. PATENT DOCUMENTS

| 2005/0046951 | A1* | 3/2005 | Sugihara ............ G02B 27/2214 359/619 |
| 2005/0157223 | A1 | 7/2005 | Sung et al. |
| 2005/0276071 | A1* | 12/2005 | Sasagawa .......... G02B 27/2214 362/607 |
| 2006/0132673 | A1* | 6/2006 | Ito ..................... G02F 1/133615 349/65 |

(Continued)

FOREIGN PATENT DOCUMENTS

| JP | A-2005-196147 | 7/2005 |
| JP | A-2006-228723 | 8/2006 |

(Continued)

*Primary Examiner* — Kathy Wang-Hurst
*Assistant Examiner* — David Tung
(74) *Attorney, Agent, or Firm* — Oliff PLC

(57) ABSTRACT

A display device includes a backlight unit, a light guiding plate which is overlappingly arranged on an optical panel, light emitting elements which are arranged on the side surface of the light guiding plate, and a light source driving unit which drives the light emitting elements. The light source driving unit intermittently turns on all of the light emitting elements when displaying a 3D image on the optical panel. In contrast to this, when displaying a 2D image on the optical panel, each light emitting intensity of the light emitting elements in a part of rows is set to be the same as that in a 3D mode, and each light emitting intensity of the light emitting elements in a part of rows other than that is set to be lower than that in the 3D mode.

17 Claims, 10 Drawing Sheets

(56) References Cited

U.S. PATENT DOCUMENTS

| | | | |
|---|---|---|---|
| 2006/0181895 A1 | 8/2006 | Hu et al. | |
| 2007/0126691 A1* | 6/2007 | Lin | G02B 27/2264 345/102 |
| 2008/0284801 A1* | 11/2008 | Brigham | H04N 13/0033 345/690 |
| 2008/0297671 A1* | 12/2008 | Cha | G09G 3/003 349/15 |
| 2008/0304285 A1* | 12/2008 | Iwasaki | G02B 6/0041 362/612 |
| 2008/0316596 A1* | 12/2008 | Cha | G02B 27/2214 359/463 |
| 2009/0091667 A1* | 4/2009 | Schultz | G02B 27/2214 349/15 |
| 2011/0012896 A1* | 1/2011 | Ji | H04N 13/0429 345/419 |
| 2011/0057965 A1* | 3/2011 | Park | G09G 3/003 345/690 |
| 2011/0141244 A1* | 6/2011 | Vos | G02B 3/0006 348/51 |
| 2011/0175978 A1 | 7/2011 | Ito | |
| 2011/0273480 A1* | 11/2011 | Park | G02B 27/2264 345/690 |
| 2012/0069063 A1 | 3/2012 | Sato et al. | |
| 2012/0075698 A1 | 3/2012 | Minami | |

FOREIGN PATENT DOCUMENTS

| | | |
|---|---|---|
| JP | A-2007-187823 | 7/2007 |
| JP | A-2011-150144 | 8/2011 |
| JP | A-2011-222237 | 11/2011 |
| JP | A-2012-68588 | 4/2012 |
| JP | A-2012-226199 | 11/2012 |

* cited by examiner

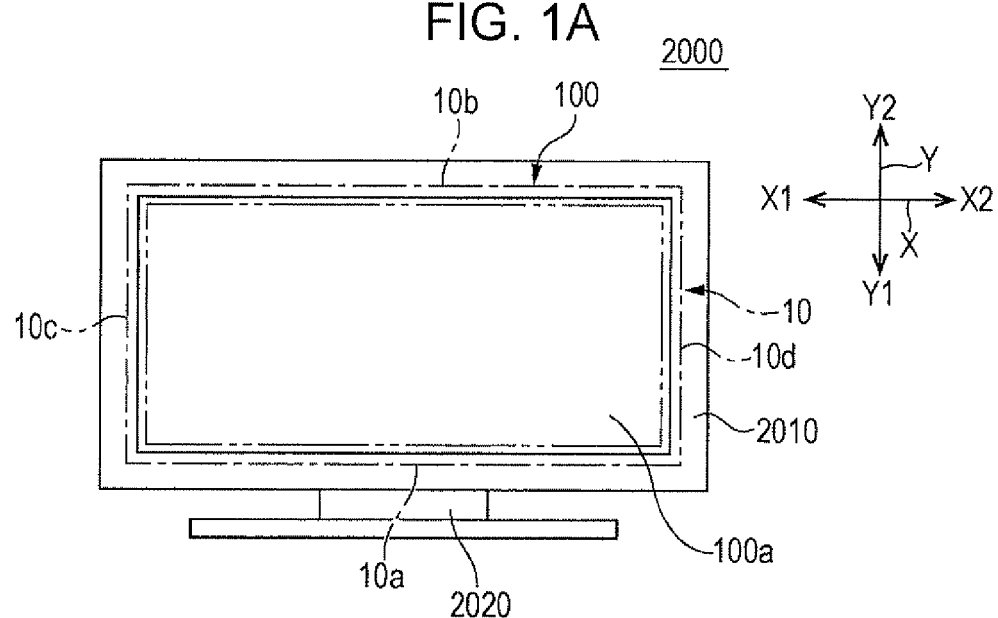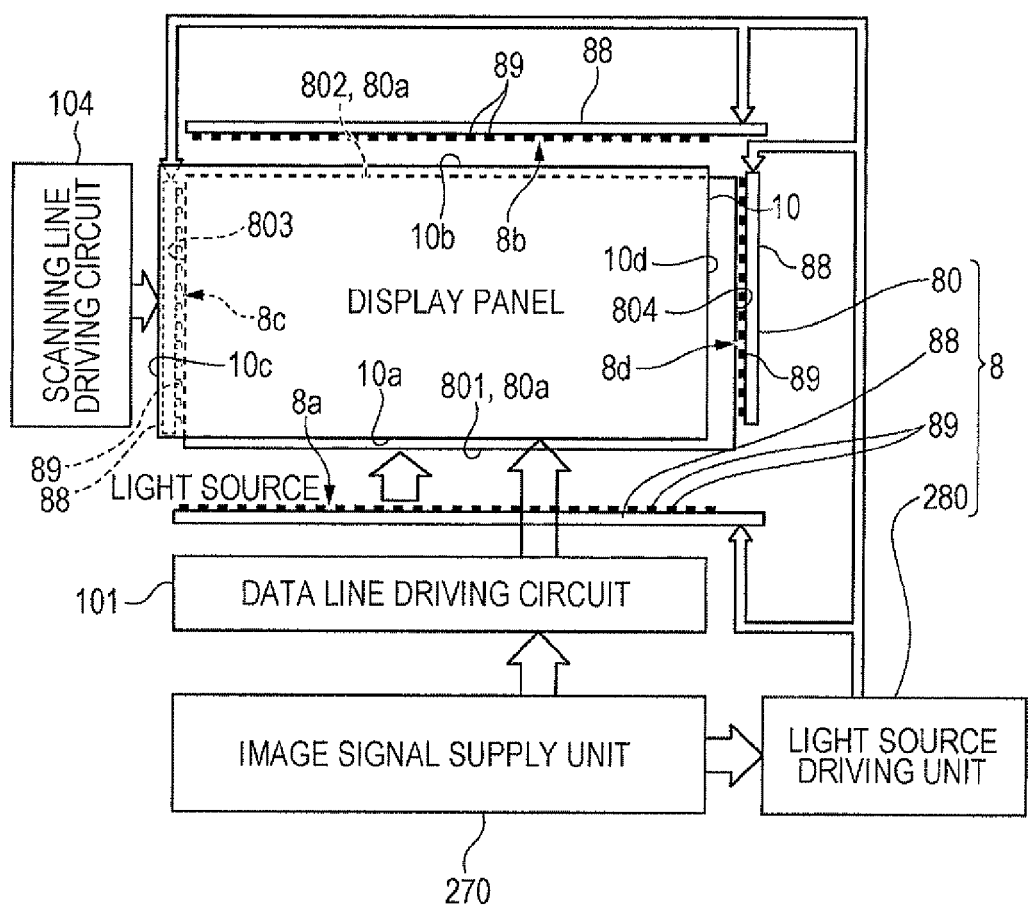

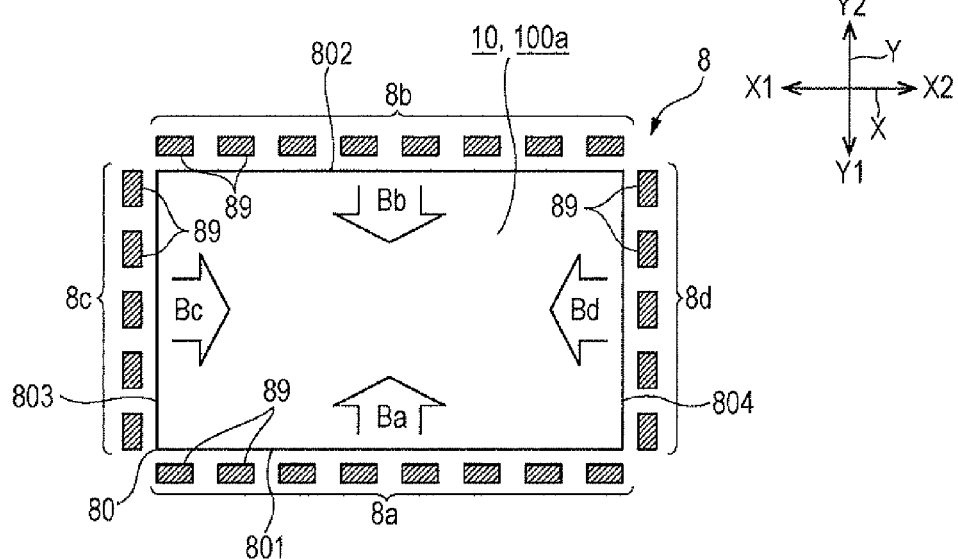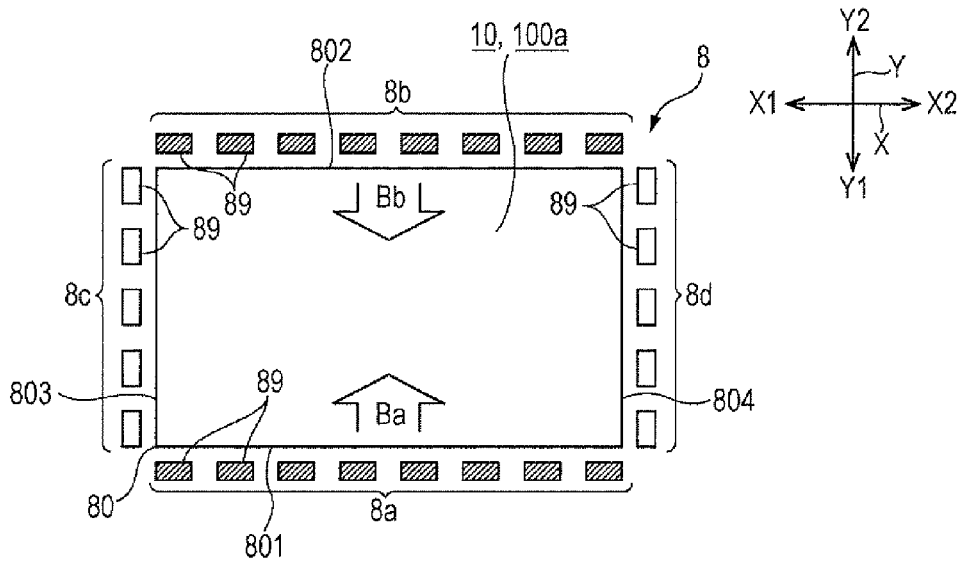

DISPLAY DEVICE AND ELECTRONIC APPARATUS

BACKGROUND

1. Technical Field

The present invention relates to a liquid crystal display device in which a first mode displaying a first image and a second image which are divided based on the time the images are captured based on the time the images are captured or optically in an image display area, and a second mode displaying an image without dividing the image based on the time the image is captured or optically in the image display area are executed, and an electronic apparatus including the liquid crystal display device.

2. Related Art

A liquid crystal display device includes a liquid crystal panel having an image display area, and a backlight unit which supplies illumination light to the liquid crystal panel, and the backlight unit includes a light guiding plate which is overlappingly arranged at a side opposite to an output side of display light with respect to the liquid crystal panel, a light source which is arranged at the side surface of the light guiding plate, and a light source driving unit which drives the light source. In recent years, as a liquid crystal display device, a device in which a first mode displaying a first image and a second image which are divided based on the time the images are captured or optically in an image display area, and a second mode displaying an image without dividing thereof based on the time the image is captured or optically in the entire region of the image display area are executed has been proposed. For example, a liquid crystal display device in which a 3D mode (first mode) which displays a 3D image (three-dimensional image/stereoscopic image) using the first and second images, by displaying the first and second images by dividing thereof based on the time the images are captured or optically in an image display area, and a 2D mode (second mode) which displays a 2D image (two-dimensional image/planar image) without dividing the image based on the time the images are captured or optically in the entire image display area are used in a switching manner has been proposed. However, when the 3D image and the 2D image are displayed on the liquid crystal panel, as described below with reference to FIGS. 10A to 10C, a display of the 3D image becomes dark.

FIGS. 10A, 10B, and 10C are explanatory diagrams displaying a 3D image and a 2D image on a liquid crystal panel, and in which FIG. 10A is an explanatory diagram which illustrates an ON state of a light source, FIG. 10B is an explanatory diagram which illustrates an ON time period of the light source when displaying the 3D image, and FIG. 10C is an explanatory diagram which illustrates an ON time period of the light source when displaying the 2D image, respectively. In addition, in the examples illustrated in FIGS. 10A, 10B, and 10C, in the case of displaying either the 3D image, or the 2D image, as illustrated in light beams Ba, Bb, Bc, and Bd which are the light beams from the light source, and are denoted by arrows in FIG. 10A, it is assumed that light from the light source (not shown) are input from four side surfaces of a light guiding plate in a backlight unit.

First, as illustrated in FIG. 10B, when displaying the 3D image on the liquid crystal panel, a time t0 to t1 is a transitional period in which a left eye image (L) which has been displayed up to that point is rewritten as a right eye image (R) from the upper side to the lower side of the liquid crystal panel, and all of the light sources turn to OFF states during the transitional period. In the time t0 to t1, when rewriting from the left eye image (L) to the right eye image (R) is ended, the right eye image (R) is written in the liquid crystal panel again in the subsequent time t1 to t2. Since all of the light sources turn to ON state in the time t1 to t2, the right eye image (R) is displayed by the light beams Ba, Bb, Bc, and Bd from the light source. A viewer wears shutter glasses on which liquid crystal shutters corresponding to the left and right eyes are arranged, the right eye image (R) is displayed in the entire image display area, a liquid crystal shutter corresponding to the right eye of the shutter glasses becomes a transmission state in the time t1 to t2 in which all of the light sources are ON states, and the liquid crystal shutter corresponding to the left eye becomes a light shielding state. In this manner, the right eye image (R) is viewed only in the right eye. Hereinafter, similar operations are repeated. In contrast to this, when the 2D image is displayed on the liquid crystal panel, since all of the light sources are always ON states, an image is displayed by the light beams Ba, Bb, Bc, and Bd from the light source. Here, the ON state of the backlight unit is intermittent in the 3D mode, however, the ON state of the backlight unit in the 2D mode is continuous. For this reason, when the 3D image is displayed, there is a big difference in brightness between the 3D image and 2D image, since a light amount supplied to the liquid crystal panel from the backlight unit becomes a half of that when displaying the 2D image when displaying the 3D image. In addition, since the left eye image (L) and the right eye image (R) are displayed on the liquid crystal panel using a time difference, when the left eye image (L) and the right eye image (R) are composited, brightness of the 3D image is lowered by a half or less compared to that of the 2D image.

Therefore, a technology in which all of a plurality of light emitting elements which are arranged along one side surface of a light guiding plate as light sources are turned on when displaying a 3D image, and on the other hand, a plurality of light emitting elements are alternately turned on when displaying a 2D image has been proposed (refer to FIG. 2 in JP-A-2006-228723).

However, as in the technology which is disclosed in FIG. 2 in JP-A-2006-228723, in a technology in which a plurality of light emitting elements are alternately turned on when displaying a 2D image, since a light emitting element in an OFF state is interposed between light emitting elements which are ON states, a distribution of an intensity of light input to a light guiding plate becomes largely different in places, and as a result, there is a problem in that the distribution of an intensity of light input from the light guiding plate to a liquid crystal panel deteriorates, and an image quality remarkably deteriorates.

The above described problem similarly occurs when the first image and the second image are optically divided, and are displayed at the same time in an image display area using different polarization in a first mode, and a 3D image is displayed by the first and second images. In addition, the above problem similarly occurs when the first image formed by the 2D image which is displayed in the image display area is viewed by a specific person in the first mode, and the second image formed by the 2D image which is displayed in the image display area is viewed by a different person.

SUMMARY

An advantage of some aspects of the invention is to provide a display device which can suppress a deterioration in an image quality in a second mode, even when a difference in brightness between the first mode in which a first image and a second image which are divided based on the time the images are captured or optically are displayed and a second mode in which an image is displayed without being divided based on the time the images is captured or optically is compressed, and an electronic apparatus.

According to an aspect of the invention, there is provided a display device which includes an optical panel including an image display area; a backlight unit including a light guiding plate which disposed to be overlapped to the optical panel, and light sources which are arranged at a plurality of side surfaces of the light guiding plate; a first mode in which a first image and a second image which are divided based on the time or optically each other are displayed in the image display area; and a second mode which a third image is displayed without being divided based on the time or optically in the image display area, in which the light sources include a first light emitting element row which disposed along a first side surface among the plurality of the side surfaces and a second light emitting element row which disposed along a second side surface which is different from the first side surface among the plurality of the side surfaces, and in which a second average of light emitting intensity of the light sources in the second mode is lower than a first average of light emitting intensity of the light sources in the first mode by controlling at least the light emitting intensity of the second light emitting element row.

In this case, at least the light emitting intensity of the second light emitting element row is controlled in the second mode which the image is displayed without being divided based on the time or optically, the average of light emitting intensity of the light sources is set to be smaller than the first mode in which a first image and a second image which are divided based on the time or optically each other are displayed. For this reason, it is possible to compress a difference in brightness between the images which are divided in the first mode and the image in the second mode. In addition, each of the light emitting intensity of light emitting elements in the light emitting element row is the same since the light emitting intensity is controlled in each light emitting element row in the second mode. Accordingly, distribution of an intensity of light input from the light guiding plate to an optical panel does not deteriorate. Therefore, it is possible to suppress a deterioration in an image quality in the second mode.

According to the aspect, a first light emitting intensity of the first light emitting element row is set to be the same as that in the first mode, and a second light emitting intensity of the second light emitting element row is set to be lower than that in the first mode, in the second mode. In addition, according to the aspect, the second light emitting element row is set to be an OFF state in the second mode.

According to the aspect, for example, in the first mode, a first image display period in which the first image is displayed in the image display area, a first transitional period in which a display in the image display area is rewritten from the first image to the second image, a second image display period in which the second image is displayed in the image display area, and a second transitional period in which a display in the image display area is rewritten from the second image to the first image may be performed in order, the first light emitting element row and the second light emitting element row may be turned on in the first image display period and the second image display period, and the first light emitting element row and the second light emitting element row may be turned off in the first transitional period and the second transitional period. In this case, it is possible to display the first image and the second image by dividing thereof based on the time the images are captured.

According to the aspect, a configuration in which the first side surface and the second side surface are crossed may be adopted. In addition, according to the aspect, a configuration in which the first side surface and the second side surface may face each other in one direction on the light guiding plate.

According to another aspect of the invention, there is provided a display device which includes an optical panel including an image display area; a backlight unit including a light guiding plate which disposed to be overlapped to the optical panel, and light sources which are arranged at a plurality of side surfaces of the light guiding plate; a first mode in which a first image and a second image which are divided based on the time or optically each other are displayed in the image display area; and a second mode which a third image is displayed without being divided based on the time or optically in the image display area, in which the light source includes a first light emitting element row which disposed along a first side surface among the plurality of the side surfaces, a second light emitting element row which disposed along a second side surface which is different from the first side surface among the plurality of the side surfaces, a third light emitting element row which disposed along a third side surface facing the first side surface and a fourth light emitting element row which disposed along a fourth side surface facing the second side surface, and in which a second average of light emitting intensity of the light sources in the second mode is lower than a first average of light emitting intensity of the light sources in the first mode by controlling at least the light emitting intensities of the second light emitting element row and the fourth light emitting element row. In this case, at least the light intensities of the second light emitting element row and the fourth light emitting row are controlled, and the average of light emitting intensity of the light sources is decreased in the second mode compared to the first mode. For this reason, it is possible to compress a difference in brightness between images which are divided in the first mode and an image in the second mode. In addition, each of the light emitting intensity of light emitting elements in the light emitting element row is the same since the light emitting intensity is controlled in each light emitting element row in the second mode. Accordingly, distribution of an intensity of light input to an optical panel from a light guiding plate does not deteriorate. Therefore, it is possible to suppress a deterioration in an image quality in the second mode.

According to the aspect, a first light emitting intensities of the first light emitting element row and the third light emitting element row may be set to be the same as those in the first mode, and a second light emitting intensities of the second light emitting element row and the fourth light emitting element row may be set to be lower than those in the first mode, in the second mode. In addition, according to the aspect, the second light emitting element row and the fourth light emitting element row are set to be an OFF state in the second mode.

According to the aspect, a first light emitting intensities of the first light emitting element row and the second light emitting element row may be set to be the same as those in the first mode, and a second light emitting intensities of the third light emitting element row and the fourth light emitting element row may be set to be lower than those in the first mode, in the second mode. In addition, according to the aspect, the third light emitting element row and the fourth light emitting element row are set to be an OFF state in the second mode.

According to the aspect, for example, in the first mode, a first image display period in which the first image is displayed in the image display area, a first transitional period in which a display in the image display area is rewritten from the first image to the second image, a second image display period in which the second image is displayed in the image display area, and a second transitional period in which a display in the image display area is rewritten from the second image to the first image may be performed in order, the first light emitting element row, the second light emitting element row, the third light emitting element row and the fourth light emitting element row may be turned on in the first image display period and the second image display period, and the first light emitting element row, the second light emitting element row, the third light emitting element row, and the fourth light emitting element row may be turned off in the first transitional period and the second transitional period. In this case, it is possible to display the first image and the second image by dividing thereof based on the time the images are captured.

According to any of the aspects, the image display area has a plurality of first pixels and a plurality of second pixels which are divided from the plurality of the first pixels, the first image is displayed using first polarization light and the plurality of the first pixels, and the second image is displayed using second polarization light and the plurality of the second pixels in the first mode may be adopted. In this case, it is possible to display the first image and the second image by dividing thereof optically.

According to any of the aspects, for example, the first mode may be a 3D mode in which a 3D image is displayed, and the second mode may be a 2D mode in which a 2D image is displayed.

According to any of the aspects, in the first light emitting element row and the second light emitting element row, a first emission optical axis of light emitting elements on the first light emitting element row and a second emission optical axis of light emitting elements on the second light emitting element row may be deviated in an extending direction of the first side surface, and the light guiding plate may be formed with diffusing patterns of which a diffusing degree is increased toward a position away from a position which is close to light emitting element on the first light emitting element row in a region which is overlapped with the first emission optical axis when planarly viewed, and may be formed with diffusing patterns of which a diffusing degree is increased toward a position away from a position which is close to light emitting element on the second light emitting element row in a region which is overlapped with the second emission optical axis when planarly viewed. In this case, in the second mode, it is possible to maintain a state in which luminance distribution is appropriate even when the light emitting intensity of the first light emitting element row and the second light emitting element row facing across the light guiding plate are changed.

The display device according to any of the aspects is used in an electronic apparatus such as a liquid crystal television.

BRIEF DESCRIPTION OF THE DRAWINGS

The invention will be described with reference to the accompanying drawings, wherein like numbers reference like elements.

FIGS. 1A and 1B are explanatory diagrams of a liquid crystal television (electronic apparatus) including a liquid crystal display device according to a first embodiment of the invention.

FIGS. 4A and 4B are explanatory diagrams which illustrate lighting patterns of light emitting elements in the liquid crystal display device according to the first embodiment of the invention.

DESCRIPTION OF EXEMPLARY EMBODIMENTS

Figure 2A:
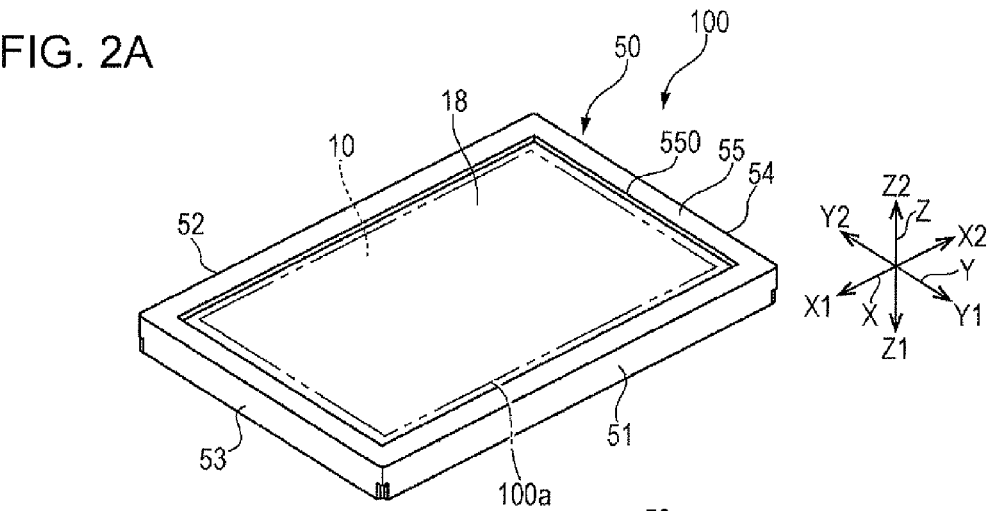
FIGS. 2A and 2B are explanatory diagrams which illustrate the entire configuration of the liquid crystal display device according to the first embodiment.

Embodiments applying the invention to a liquid crystal display device for a liquid crystal television will be described with reference to drawings. In addition, in the drawings which will be referred to in the following descriptions, a different reduced scale is used in each layer, or each member in order to make each of the layers, or members have a recognizable size on the drawings. In addition, in the following descriptions, the directions in which a light guiding plate, or a liquid crystal panel intersects each other in the in-plane direction are set to the X axis direction (horizontal direction) and the Y axis direction (vertical direction/perpendicular direction), and the direction which intersects the X axis direction and the Y axis direction is set to the Z axis direction (thickness direction). In addition, in the drawings which will be described below, one side in the X axis direction (left side toward image) is set to an X1 side, the other side (right side toward image) is set to an X2 side, one side in the Y axis direction (lower side of image) is set to a Y1 side, and the other side (upper side of image) is set to a Y2 side. In addition, one side in the Z axis direction (rear side/side opposite to side from which illumination light or display light is output) is set to a Z1 side, and the other side (front side/side from which illumination light or display light is output) is set to a Z2 side.

In addition, in the following embodiments, an example of executing a 3D mode which displays a left eye image (first image) and a right eye image (second image) for a 3D image by giving a time difference, by setting "a first mode" in which the first image and the second image are displayed by being divided based on the time the images are captured or optically in the entire region of an image display area of a liquid crystal panel in the liquid crystal display device will be described. In this case, "a second mode" in which an image is displayed in the entire region of the image display area without being divided based on the time the images are captured or optically corresponds to a 2D mode in which a 2D image is displayed in the entire region of the image display area. According to the embodiment, in the 3D mode, a viewer views a right eye image and a left eye image alternately using shutter glasses. In addition, as will be described later, the invention can be applied to a liquid crystal display device which adopts a method in which a 3D image and a 2D image are displayed in naked eyes by being switched by providing a variable barrier such as a Liquid Crystal Parallax barrier in a liquid crystal panel, in addition to a method of wearing polarization glasses or the like.

First Embodiment

Entire Configuration

FIGS. 1A and 1B are explanatory diagrams of a liquid crystal television (electronic apparatus) including a liquid crystal display device according to a first embodiment of the invention, and in which FIG. 1A is an explanatory diagram which schematically illustrates an appearance of a liquid crystal television, and FIG. 1B is a block diagram which illustrates an electrical configuration of the liquid crystal display device, respectively.

An electronic apparatus 2000 which is illustrated in FIG. 1A is a liquid crystal television, and includes a liquid crystal display device 100, a television frame 2010, and a television stand 2020, or the like. The liquid crystal display device 100 includes a transmission type liquid crystal panel 10, an image signal supply unit 270 which supplies an image signal to the liquid crystal panel 10, and a backlight unit 8 which supplies illumination light to the liquid crystal panel 10. In addition, the liquid crystal display device 100 includes a scanning line driving circuit 104 which drives scanning lines extending in the X axis direction in the liquid crystal panel 10, and a data line driving circuit 101 which drives data lines extending in the Y axis direction in the liquid crystal panel 10. It is possible to adopt a configuration in which both the scanning line driving circuit 104 and the data line driving circuit 101 are built in the liquid crystal panel 10. In addition, it is possible to adopt a configuration in which one of the scanning line driving circuit 104 and the data line driving circuit 101 is built in the liquid crystal panel 10, and the other is built in a driving IC which is COG-mounted in the liquid crystal panel 10, or a configuration in which both the scanning line driving circuit 104 and the data line driving circuit 101 are built in the driving IC which is COG-mounted in the liquid crystal panel 10. In addition, it is possible to adopt a configuration in which one of the scanning line driving circuit 104 and the data line driving circuit 101 is built in the liquid crystal panel 10, and the other is built in a driving IC which is mounted on a circuit board which is electrically connected to the liquid crystal panel 10. In addition, it is also possible to adopt a configuration in which both the scanning line driving circuit 104 and the data line driving circuit 101 are built in a separate driving IC from the liquid crystal panel 10, or the like.

The backlight unit 8 includes a light guiding plate 80 which is overlappingly arranged in the liquid crystal panel 10, a plurality of light emitting elements 89 (light source) which are arranged along the side surface of the light guiding plate 80, light source substrate 88 on which the plurality of light emitting elements 89 are mounted, and a light source driving unit 280 which drives the plurality of light emitting elements 89. The liquid crystal panel 10 is a quadrangle, and has four sides 10a, 10b, 10c, and 10d. Among the four sides 10a, 10b, 10c, and 10d, the side 10a is a long side which is located at one side Y1 in the Y axis direction, the side 10b is a long side which is located at the other side Y2 in the Y axis direction, the side 10c is a short side which is located at one side X1 in the X axis direction, and the side 10d is a short side which is located at the other side X2 in the X axis direction. The light guiding plate 80 has four side surfaces 801, 802, 803, and 804 corresponding to the shape. Among the side surfaces 801, 802, 803, and 804, the side surface 801 is located at the long side on one side Y1 in the Y axis direction, the side surface 802 is located at the long side on the other side Y2 in the Y axis direction, the side surface 803 is located at the short side on one side X1 in the X axis direction, and the side surface 804 is located at the short side on the other side X2 in the X axis direction. Accordingly, the light guiding plate 80 includes a set of side surfaces 801 and 802 facing in the Y axis direction, and a set of side surfaces 803 and 804 facing in the X axis direction.

According to the embodiment, all of the four side surfaces 801, 802, 803, and 804 of the light guiding plate 80 become a light input unit 80a. For this reason, the light emitting elements 89 are arranged along the four side surfaces 801, 802, 803, and 804 of the light guiding plate 80, and the light source substrate 88 extends along the four side surfaces 801, 802, 803, and 804 of the light guiding plate 80.

In the liquid crystal display device 100, the image signal supply unit 270 displays a 3D image (three-dimensional image/stereoscopic image) and a 2D image (two-dimensional image/planar image) on the liquid crystal panel 10. In addition, as will be described later, the light source driving unit 280 switches a driving pattern of the light emitting elements 89 in the backlight unit 8, in a 3D mode (first mode) in which a 3D image is displayed on the liquid crystal panel 10, and a 2D mode (second mode) in which a 2D image is displayed on the liquid crystal panel 10 based on a signal which is output from the image signal supply unit 270.

Specific Configuration of Liquid Crystal Display Device 100

Figure 2B:
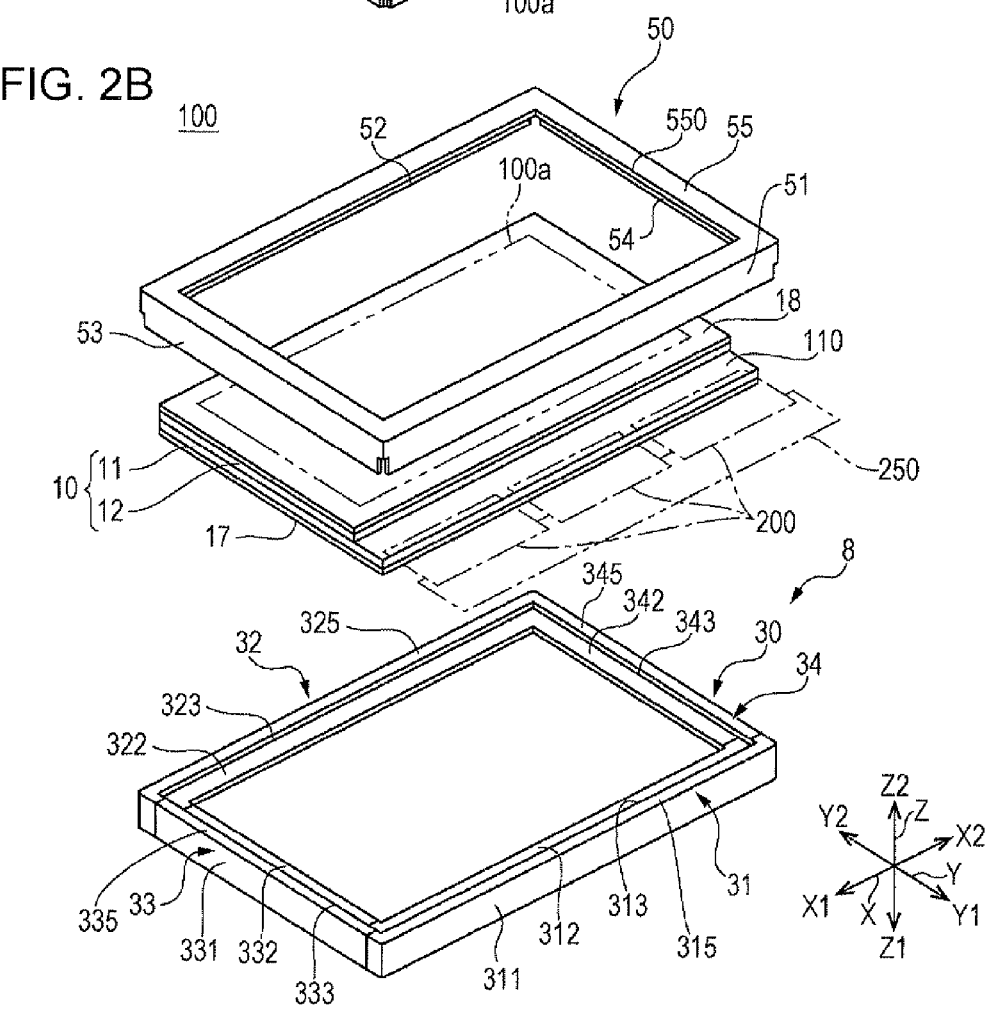
Figure 3:
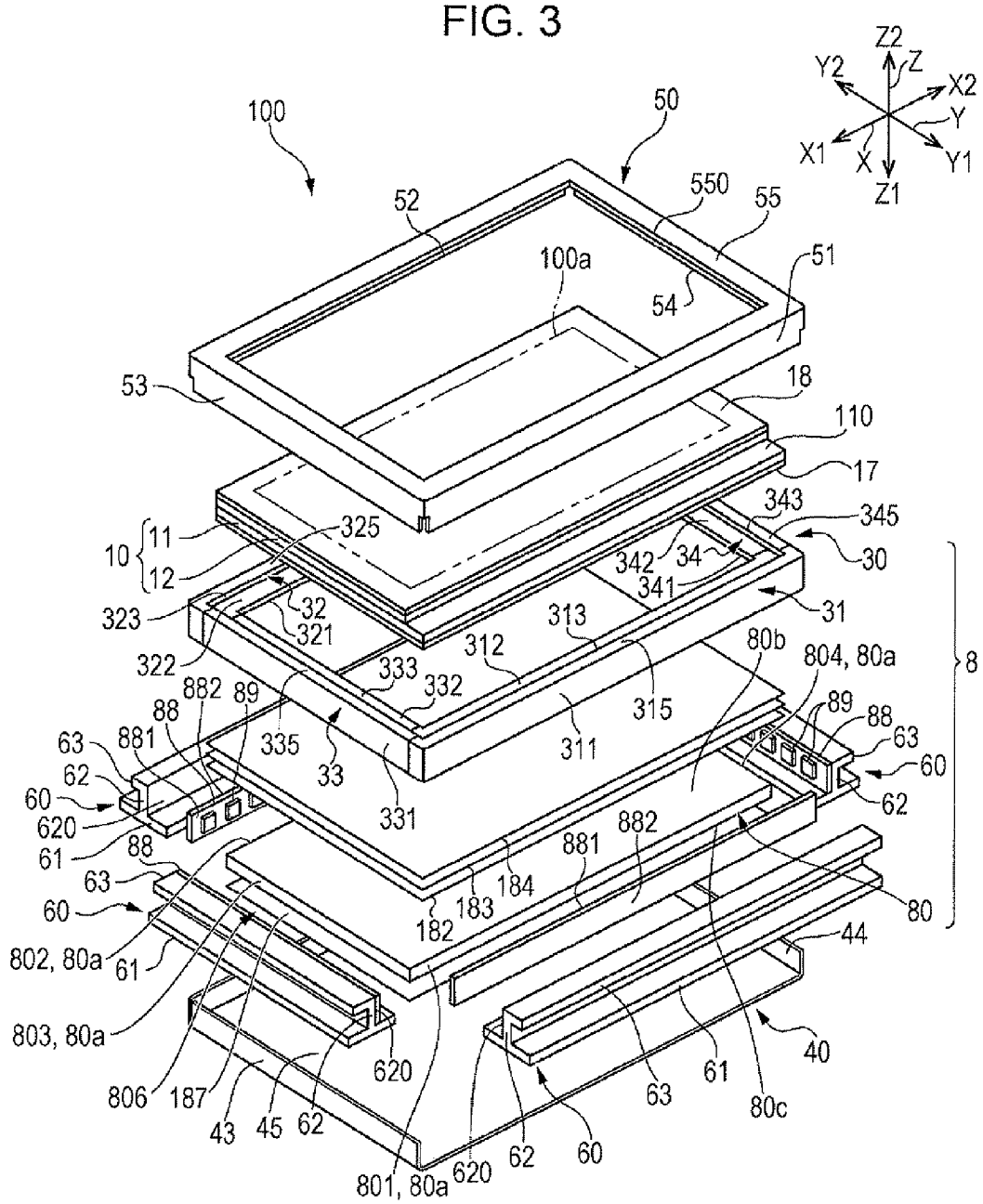
FIG. 3 is an exploded perspective view when the liquid crystal display device according to the first embodiment of the invention is further finely taken apart.

FIGS. 2A and 2B are explanatory diagrams which illustrate the entire configuration of the liquid crystal display device 100 according to the first embodiment of the invention. FIG. 2A is a perspective view, and FIG. 2B is an exploded perspective view of the liquid crystal display device 100, respectively. FIG. 3 is an exploded perspective view when the liquid crystal display device 100 according to the first embodiment of the invention is further finely taken apart.

As illustrated in FIGS. 2A, 2B, and FIG. 3, the liquid crystal display device 100 includes a support plate 40 which is arranged so as to cover a rear surface side of the light guiding plate 80 (one side Z1 in Z axis direction), a resin frame 30 which maintains end portions of the liquid crystal panel 10 in front of the support plate 40, and maintains the backlight unit 8 by surrounding the unit, and a metal frame 50 which is arranged at the front side (the other side Z2 in Z axis direction) of the resin frame 30.

The resin frame 30 has a rectangular frame shape which maintains end portions of the liquid crystal panel 10, and surrounds the periphery of the liquid crystal panel 10, and according to the embodiment, the resin frame 30 is formed by four frame plates 31, 32, 33, and 34 which is divided into each of four sides of the liquid crystal panel 10. The resin frame 30 is black, and prevents stray light from occurring in the backlight unit 8 by functioning as a light absorbing member. The frame plates 31, 32, 33, and 34 respectively includes side plate portions 311, 321, 331, and 341 which extend on the rear surface side of the frame plates 31, 32, 33, and 34, front plate portions 315, 325, 335, and 345 which are bent to the inside from the front end edge of the side plate portions 311, 321, 331, and 341, and protruded plate portions 312, 322, 332, and 342 which project inside from positions which are in the middle of the height direction of the front plate portions 315, 325, 335, and 345. For this reason, step portions 313, 323, 333, and 343 are formed inside the frame plates 31, 32, 33, and 34 by the protruded plate portions 312, 322, 332, and 342, and the liquid crystal panel 10 is maintained by the step portions 313, 323, 333, and 343 and the protruded plate portions 312, 322, 332, and 342. In addition, the light guiding plate 80 of the backlight unit 8, the light emitting elements 89, and the like are arranged on the rear surface side of the protruded plate portions 312, 322, 332, and 342.

The support plate 40 is formed by a thin metal plate such as an SUS plate using press working or the like. The support plate 40 includes a base plate portion 45, and three side plate portions 42, 43, and 44 which stand up toward the front side from three sides excluding one side Y1 in the Y axis direction among outer peripheral edges of the base plate portion 45, and the side plate portions 321, 331, and 341 of the resin frame 30 are overlapped with the outside of the side plate portions 42, 43 and 44. In addition, the side plate portion 311 of the resin frame 30 covers the one side Y1 in the Y axis direction of the support plate 40.

The metal frame 50 is also formed by a thin metal plate such as the SUS plate using the press working or the like, similarly to the support plate 40. The metal frame 50 includes a front plate portion 55, and four side plate portions 51, 52, 53, and 54 which are bent downward from the outer peripheral edges of the front plate portion 55, and has a rectangular box shape of which the rear surface side is open. The side plate portions 51, 52, 53, and 54 are overlapped so as to cover the outside of the side plate portions 311, 321, 331, and 341 of the resin frame 30. The front plate portion 55 is formed with a rectangular window 550 which outputs light which is output from the liquid crystal panel 10, and the front plate portion 55 covers the entire outer peripheral end portion among display light output sides of the liquid crystal panel 10. In addition, the front plate portion 55 of the metal frame 50 is provided so as to completely cover the front part of the front plate portions 315, 325, 335, and 345 of the resin frame 30.

The liquid crystal panel 10, or the backlight unit 8 is maintained inside when the metal frame 50, the resin frame 30, and the support plate 40 which are configured in this manner are joined using screws (not shown) or the like. In this state, the support plate 40 supports the liquid crystal panel 10 through the backlight unit 8.

Configuration of Liquid Crystal Panel 10

The liquid crystal panel 10 is a liquid crystal panel which has a quadrangular planar shape, and includes an element substrate 11 on which pixel electrodes (not shown) and the like are formed, a counter substrate 12 which is arranged so as to face the element substrate 11 with a predetermined gap, and a sealing material (not shown) of a rectangular frame shape which bonds the counter substrate 12 and the element substrate 11. Descriptions of a detailed configuration, or drawings of the liquid crystal panel 10 are omitted, however, a liquid crystal layer is maintained in a region which is surrounded with the sealing material. The element substrate 11, and the counter substrate 12 are formed by a translucent substrate such as a glass substrate or the like. A plurality of scanning lines are extended in the X axis direction, while a plurality of data lines are extended in the Y axis direction in the element substrate 11, and switching elements and pixel electrodes (not shown) are provided at intersections between the scanning lines and the data lines.

According to the embodiment, the counter substrate 12 is arranged on the output side of the display light, and the element substrate 11 is arranged on the backlight unit 8 side. In addition, in the counter substrate 12, a frame layer which is formed by a rectangular light shielding layer is formed along the inner edges of four sides of the sealing material on the surface facing the element substrate 11, and a region which is defined by the inner edges of the frame layer is an image display area 100*a*.

The liquid crystal panel 10 is configured as a liquid crystal panel of a Twisted Nematic (TN), Electrically Controlled Birefringence (ECB), or Vertical Aligned Nematic (VAN), and in which pixel electrodes are formed on the element substrate 11, and common electrodes (not shown) are formed on the counter substrate 12. In addition, when the liquid crystal panel 10 is a liquid crystal panel of In Plane Switching (IPS), or Fringe Field Switching (FFS), the common electrodes are provided on the element substrate 11 side. In addition, there is also a case in which the element substrate 11 is arranged on the output side of the display light with respect to the counter substrate 12. An upper polarizing plate 18 is overlappingly arranged on the top surface of the liquid crystal panel 10, and a lower polarizing plate 17 is arranged between the lower surface of the liquid crystal panel 10 and the backlight unit 8.

According to the embodiment, the element substrate 11 is larger than the counter substrate 12. For this reason, the element substrate 11 has a projected portion 110 which projects from an end portion of the counter substrate 12 in one side Y1 in the Y axis direction, and a plurality of flexible wiring substrates 200 are connected to the projected portion 110. In addition, the plurality of flexible wiring substrates 200 are connected to a common wiring substrate 250, and a signal or the like is input to the liquid crystal panel 10 through the flexible wiring substrates 200 and the common wiring substrate 250.

Configuration of Backlight Unit 8

The backlight unit 8 includes the light guiding plate 80 which is overlappingly arranged on the rear surface side of the liquid crystal panel 10, and the plurality of light emitting elements 89 which are arranged in a light input unit 80*a* of the light guiding plate 80 toward a light emitting surface. The light emitting elements 89 are driven by the light source driving unit 280 which is illustrated in FIGS. 1A and 1B. The plurality of light emitting elements 89 are mounted on one surface 881 of the light source substrate 88 which extends along the light input unit 80*a*. The light emitting elements 89 are Light Emitting Diodes (LEDs) which emit white light, and output light of the light source as emission light.

In the backlight unit 8 according to the embodiment, the side surfaces 801, 802, 803, and 804 of the light guiding plate 80 are used as the light input units 80*a*. For this reason, the plurality of light emitting elements 89 make light emitting surfaces thereof face the four side surfaces 801, 802, 803, and 804 of the light guiding plate 80, and are arranged in line from one end side toward the other end side of each of the side surfaces 801, 802, 803, and 804. For this reason, as illustrated in FIG. 1B, the light emitting elements 89 is formed by a light emitting element row 8*a* which is arranged along the side surface 801 of the light guiding plate 80, a light emitting element row 8*b* which is arranged along the side surface 802 facing the side surface 801 of the light guiding plate 80, a light emitting element row 8*c* which is arranged along the side surface 803 neighboring the side surfaces 801 and 802 of the light guiding plate 80, and a light emitting element row 8*d* which is arranged along the side surface 804 facing the side surface 803 of the light guiding plate 80. In addition, the light source substrate 88 extends along each of the four light input units 80*a*, and the plurality of light emitting elements 89 are mounted on respective one side surface 881 of the light source substrate 88.

The light guiding plate 80 is a translucent resin plate which is formed of an acrylic resin, a polycarbonate resin, or the like, and a reflecting sheet 187 is overlappingly arranged between the rear surface 80c of the light guiding plate 80 and a base plate portion 45 of the support plate 40. Optical sheets such as a diffusing sheet 182, prism sheets 183 and 184, and the like are overlappingly arranged between the front surface (light emitting surface 80b) of the light guiding plate 80, and the liquid crystal panel 10. The diffusing sheet 182 is formed of a sheet including a coating layer which is formed by spreading silica particles on a translucent resin such as the acrylic resin, or the polycarbonate resin. Two prism sheets 183 and 184 are arranged so that ridgelines thereof are orthogonal to each other. For this reason, illumination light which is output from the light emitting surface 80b of the light guiding plate 80 is diffused in all directions by the diffusing sheet 182, and then is given directivity so as to have a peak in the front direction of the liquid crystal panel 10 by the two prism sheets 183 and 184.

In the light guiding plate 80, a concave minute recession, or a diffusing pattern which is formed by a printing layer of the diffusing member is formed on the rear surface 80c as a surface on the side at which the reflecting sheet 187 is located. For this reason, distribution of intensity of illumination light which is output from the light guiding plate 80 becomes uniform regardless of a distance from the light emitting element 89. According to the embodiment, as the diffusing pattern, a plurality of concave portions of a fine groove shape are provided on the rear surface 800 of the light guiding plate 80.

In the light source substrate 88, the one surface 881 on which the light emitting elements 89 are mounted is arranged so as to face the light input portion 80a of the light guiding plate 80. In addition, the light source substrate 88 has a structure in which a wiring pattern or a land is provided along with an insulating layer on the one surface 881 side of a plate shaped metal plate which stretches along the light input portion 80a. The configuration can be realized, for example, by bonding the flexible wiring substrate on which a resin base material layer, a wiring pattern, an insulation protection layer, and the like are laminated in this order to one surface side of the metal plate. Accordingly, the metal plate and the land, in which the wiring pattern and chips of the light emitting elements 89 are mounted, are electrically insulated, reliably.

On each of the other surface 882 sides of the four light source substrates 88, light source support members GO for maintaining the light source substrates 88 are respectively arranged, and the light source support member 60 is arranged between the support plate 40 and the resin frame 30, and is maintained. The light source support member 60 is a bar shaped metal component which extends along the other surface 882 of the light source substrate 88, and is tightly fixed to the entire surface of the other surface 882 of the light source substrate 88, and a substrate maintaining surface 620 of a support plate unit 62 in a surface contact state. In addition, the light source support member 60 includes a rear plate unit 61 which is overlapped with the base plate portion 45 of the support plate 40, and the support plate unit 62 which configures a wall face protruding upward from a position which is in the middle of the width direction of the rear plate unit 61. In addition, the light source support member 60 includes a front plate unit 63 which is bent to a side opposite to a side at which the light guiding plate 80 is located from the support plate unit 62 at the upper end side of the support plate unit 62 (opposite side to rear plate unit 61), and the front plate unit 63 is fixed to at least any one of a front plate portion 55 of the metal frame 50, and front plate units 315 and 325 of the resin frame 30 using a screw or the like.

Control of Light Emitting Element 89 when Performing 3D Display and 2D Display

FIGS. 4A and 4B are explanatory diagrams which illustrate lighting patterns of the light emitting elements 89 in the liquid crystal display device 100 according to the first embodiment of the invention. FIG. 4A is an explanatory diagram which illustrates an ON state of the light emitting elements 89 in the 3D mode (first mode), and FIG. 4B is an explanatory diagram which illustrates an ON state of the light emitting elements 89 in the 2D mode (second mode), respectively. In addition, in FIGS. 4A and 4B, the light emitting elements 89 which are turned on are denoted by slanted lines.

Figure 10A:
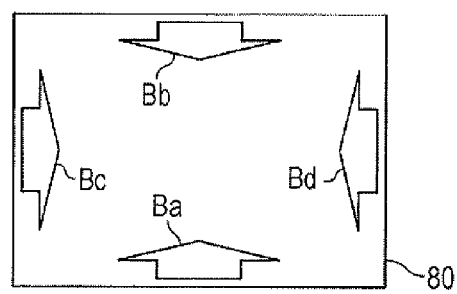
FIGS. 10A to 10C are explanatory diagrams when displaying a 3D image and a 2D image on a liquid crystal panel.
Figure 10B:
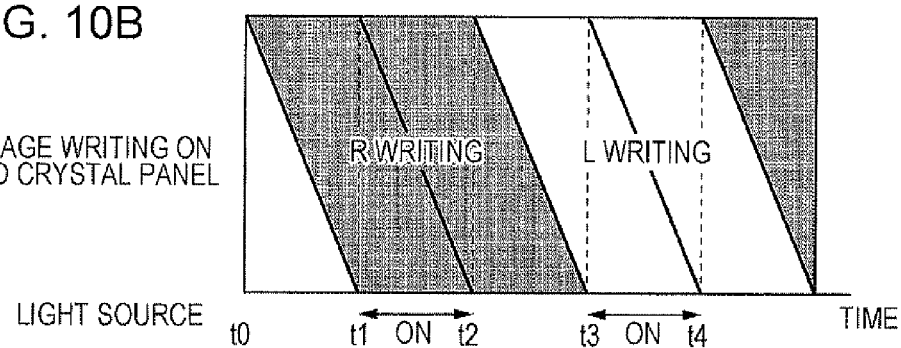
Figure 10C:
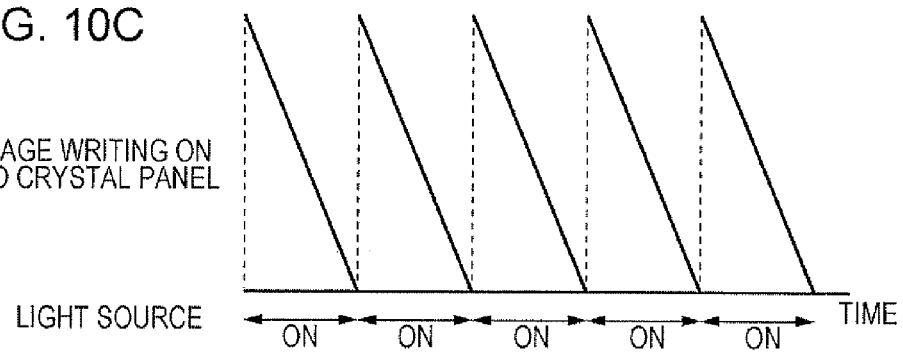

In the liquid crystal display device 100 according to the embodiment, the 3D mode (first mode) in which a 3D image is displayed in the entire area of the image display area 100a of the liquid crystal panel 10, and the 2D mode (second mode) in which a 2D image is displayed in the entire area of the image display area 100a of the liquid crystal panel 10 are executed based on a signal or the like which is output from the image signal supply unit 270 illustrated in FIGS. 1A and 1B. As described with reference to FIG. 10B, in the 3D mode, the time t0 to t1 is a transitional period (first transitional period) in which a left eye image (L) which has been displayed in an image display period (first image display period) up to that point is rewritten as a right eye image (R) toward the lower side from the upper side of the image display area 100a, and in the transitional period, the backlight unit 8 is set to an OFF state. In the transitional period of the time t0 to t1, when rewriting from the left eye image (L) to the right eye image (R) is ended, the right eye image (R) is written in the liquid crystal panel 10 again in the time t1 to t2 subsequently, and the right eye image (R) is displayed (image display period/first image display period). In the time t1 to t2, the right eye image (R) is displayed in the entire area of the image display area 100a, and the backlight unit 8 is in an OFF state. Subsequently, the right eye image (R) which has been displayed in the image display period till then (second image display period) is rewritten as the left eye image (L) toward the lower side from the upper side of the liquid crystal display panel in a transitional period of a time t2 to t3 (second transitional period). In the transitional period, the backlight unit 8 is in an OFF state. The same operation is repeated thereafter. In contrast to this, when the 2D image is displayed (2D mode) in the entire area of the image display area 100a of the liquid crystal panel 10, as illustrated in FIG. 10C, the backlight unit 8 is always in an ON state.

In the liquid crystal display device 100, according to the embodiment, in the 3D mode illustrated in FIG. 4A, all of the plurality of first light emitting elements (first light emitting element row) and the plurality of second light emitting elements (second light emitting element row) among the plurality of light emitting elements 89 are intermittently turned on. In contrast to this, in the 2D mode which is illustrated in FIG. 4B, a lighting condition is controlled in each light emitting element row, each of the light emitting intensities of the plurality of first light emitting elements (first light emitting element row) among the plurality of light emitting elements 89 is set to the same light emitting intensity in the 3D mode, and each light emitting intensity of the plurality of second light emitting elements (second light emitting element row) is set to be smaller than that in the 3D mode.

More specifically, according to the embodiment, the plurality of first light emitting elements are light emitting element rows 8a and 8b (first light emitting element row) which are arranged along the two side surfaces 801 and 802 as the first set facing each other in one direction (Y axis direction) in the light guiding plate 80, and the plurality of second light emitting elements are the light emitting element rows 8c and 8d (second light emitting element row) which are arranged along the two side surfaces 803 and 804 as the second set facing each other in the other direction (X axis direction) in the light guiding plate 80. Accordingly, in the 3D mode, when rewriting the right eye image (R) in the liquid crystal panel 10 in the time t1 to t2 which is illustrated in FIG. 10B, and when rewriting the left eye image (L) in the liquid crystal panel 10 in the time t3 to t4, all of the light emitting elements 89 belong to the light emitting element rows 8a and 8b (first light emitting element row), and the light emitting element rows 8c and 8d (second light emitting element row) are intermittently turned on.

In contrast to this, in the 2D mode, the backlight unit 8 is always turned on. However, at this time, each light emitting intensity of the plurality of first light emitting elements (light emitting element rows 8a and 8b/first light emitting element row) is set to be the same as that in the 3D mode, and each light emitting intensity of the plurality of second light emitting elements (light emitting element rows 8c and 8d/second light emitting element row) is set to be lower than that in the 3D mode. According to the embodiment, in the 2D mode, the plurality of second light emitting elements (light emitting element rows 8c and 8d) are turned off, and each light emitting intensity is set to zero.

In addition, according to the embodiment, the light emitting intensity when the light emitting element rows 8a, 8b, 8c, and 8d are turned on is the same in all of the light emitting elements 89 in the 3D mode, and in the 2D mode, the light emitting intensity when the light emitting element rows 8a, 8b are turned on is the same as that in the 3D mode, in all of the light emitting elements 89.

Main Effect of Present Embodiment

As described above, in the liquid crystal display device 100 according to the embodiment, the backlight unit 8 is intermittently turned on in the 3D mode (first mode). However, in contrast to this, the backlight unit 8 is continuously turned on in the 2D mode (second mode). In addition, all of the light emitting elements 89 belong to the light emitting element rows 8a, 8b, 8c, and 8d are intermittently turned on in the 3D mode, and on the other hand, only light emitting elements 89 belong to the light emitting element rows 8a and 8b among the light emitting element rows 8a, 8b, 8c, and 8d are continuously turned on in the 2D mode. For this reason, when displaying a 3D image, light beams Ba, Bb, Bc, and Bd of the light source which are denoted by arrows in FIG. 4A input to the light guiding plate 80, however, when displaying a 2D image, the light beams Ba and Bb of the light source which are denoted by arrows in FIG. 4B are input to the light guiding plate 80. For this reason, it is possible to compress a difference in brightness between the 3D image and the 2D image, even if there is a limitation that the light beams Ba, Bb, Bc, and Bd of the light source are intermittently used when displaying the 3D image. In addition, in the 2D mode, since a control of the light emitting element 89 is performed in each row (each light emitting element row), light emitting elements 89 which are turned on are continuously present, and a light emitting element 89 which is turned off is not present between the light emitting elements 89 which are turned on in the light emitting element rows 8a and 8b. Accordingly, it is possible to suppress a deterioration in an image quality in the 2D mode since distribution of an intensity of light which is input to the liquid crystal panel 10 from the light guiding plate 80 does not deteriorate.

In addition, according to the embodiment, in the 2D mode, the number of light emitting elements 89 which are turned on (light emitting element rows 8a and 8b) is larger than the number of light emitting elements 89 which are turned off (light emitting element rows 8c and 8d). Accordingly, it is possible to display a bright 2D image while compressing a difference in brightness between the 3D image and the 2D image.

Modification Example of First Embodiment

According to the first embodiment, in the light guiding plate 80, the first set of side surfaces facing each other in one direction (Y axis direction) are side surfaces 801 and 802, and the second set of side surfaces facing each other in the other direction (X axis direction) are side surfaces 803 and 804, however, it may be a configuration in which the first set of side surfaces are side surfaces 803 and 804, and the second set of side surfaces are side surfaces 801 and 802. According to the configuration, the plurality of first light emitting elements (first light emitting element row) are the light emitting element rows 8c and 8d which are arranged along the two side surfaces 803 and 804 which belong to the first set, and the plurality of second light emitting elements (second light emitting element row) are the light emitting element rows 8a and 8b which are arranged along the two side surfaces 801 and 802 which belong to the second set. Accordingly, in the 3D mode, the first light emitting element row (light emitting element rows 8c and 8d) and the second light emitting element row (light emitting element rows 8a and 8b) are intermittently turned on. In contrast to this, in the 2D mode, the first light emitting element row (light emitting element rows 8c and 8d) are continuously turned on, and the second light emitting element row (light emitting element rows 8a and 8b) are turned off. For this reason, according to the embodiment, it is also possible to compress the difference in brightness between the 3D image and the 2D image, similarly to the first embodiment. In addition, since a control of the light emitting element 89 is performed in each row (each light emitting element row) in the 2D mode, a turned off light emitting element 89 is not present between the light emitting elements 89 which are turned on. Accordingly, it is possible to suppress a deterioration in an image quality in the 2D mode, since distribution of an intensity of light which is input to the liquid crystal panel 10 from the light guiding plate 80 does not deteriorate.

In addition, according to the embodiment, in the 2D mode, the number of light emitting elements 89 (light emitting element rows 8c and 8d) which are turned on is smaller than the number of light emitting elements 89 (light emitting element rows 8a and 8b) which are turned off. Accordingly, it is possible to further suppress the difference in brightness between the 3D image and the 2D image.

Second Embodiment

Figure 5A:
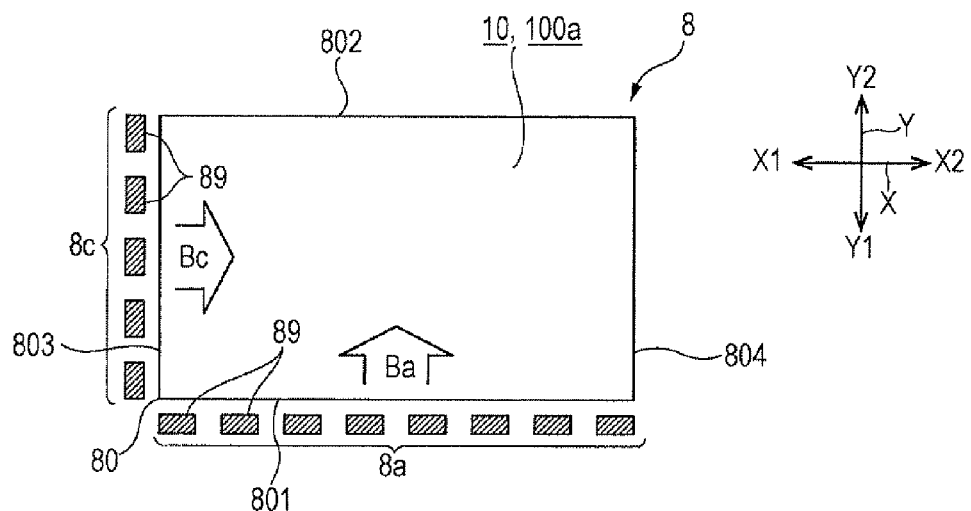
FIGS. 5A and 5B are explanatory diagrams which illustrate lighting patterns of light emitting elements in a liquid crystal display device according to a second embodiment of the invention.
Figure 5B:
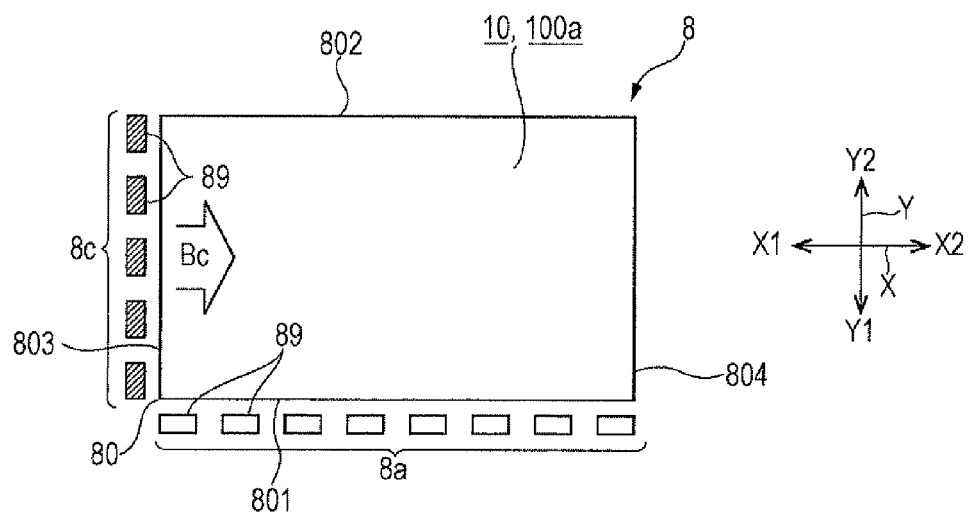

FIGS. 5A and 5B are explanatory diagrams which illustrate lighting patterns of light emitting elements 89 in a liquid crystal display device 100 according to a second embodiment of the invention. FIG. 5A is an explanatory diagram which illustrates an ON state of the light emitting elements 89 in a 3D mode, and FIG. 5B is an explanatory diagram which illustrates an ON state of the light emitting elements 89 in a 2D mode, respectively. In addition, since a basic configuration according to the embodiment is the same as that in the first embodiment, shared portions are given the same reference numerals, and descriptions thereof will be omitted. In addition, in FIGS. 5A and 5B, light emitting elements 89 which are turned on are denoted by slanted lines.

According to the first embodiment, the light emitting elements 89 are arranged along the four side surfaces 801, 802, 803, and 804 of the light guiding plate 80, however, according to the embodiment, as illustrated in FIGS. 5A and 5B, the light emitting elements 89 (light emitting element row 8a) are arranged along the side surface 801 which extends in one direction (X axis direction) in the light guiding plate 80, and the light emitting elements 89 (light emitting element row 8c) are arranged along the side surface 803 which extends in the other direction (Y axis direction) in the light guiding plate 80. Here, the light emitting elements 89 (light emitting element row 8c) which are arranged along the side surface 803 are the first light emitting elements (first light emitting element row), and the light emitting elements 89 (light emitting element row 8a) which are arranged along the side surface 801 are the second light emitting elements (second light emitting element row). Accordingly, as illustrated in FIG. 5A, in the 3D mode, the first light emitting elements (light emitting element row 8c) and the second light emitting elements (light emitting element row 8a) are intermittently turned on. In contrast to this, as illustrated in FIG. 5B, in the 2D mode, the first light emitting elements (light emitting element row 8c) are continuously turned on, and the second light emitting elements (light emitting element row 8a) are turned off.

For this reason, according to the embodiment, it is also possible to compress a difference in brightness between the 3D image and the 2D image similarly to the first embodiment. In addition, since a control of the light emitting elements 89 is performed in each row (each light emitting element row) in the 2D mode, a turned off light emitting element 89 is not present between the light emitting elements 89 which are turned on. Accordingly, it is possible to suppress a deterioration in an image quality in the 2D mode, since distribution of an intensity of light which is input to the liquid crystal panel 10 from the light guiding plate 80 does not deteriorate. In addition, in the 2D mode, the number of light emitting elements 89 (light emitting element rows 8c) which are turned on is smaller than the number of light emitting elements 89 (light emitting element rows 8a) which are turned off. Accordingly, it is possible to further suppress the difference in brightness between the 3D image and the 2D image.

Modification Example of Second Embodiment

According to the second embodiment, the light emitting elements 89 (light emitting element row 8c) which are arranged along the side surface 803 are the first light emitting elements, and the light emitting elements 89 (light emitting element row 8a) which are arranged along the side surface 801 are the second light emitting elements, however, it may be a configuration in which the light emitting elements 89 (light emitting element row 8a) which are arranged along the side surface 801 are the first light emitting elements, and the light emitting elements 89 (light emitting element row 8c) which are arranged along the side surface 803 are the second light emitting elements. In this case, in the 3D mode, the first light emitting elements (light emitting element row 8a) and the second light emitting elements (light emitting element row 8c) are intermittently turned on. In contrast to this, in the 2D mode, the first light emitting elements (light emitting element row 8a) are continuously turned on, and the second light emitting elements (light emitting element row 8c) are turned off.

Third Embodiment

Figure 6A:
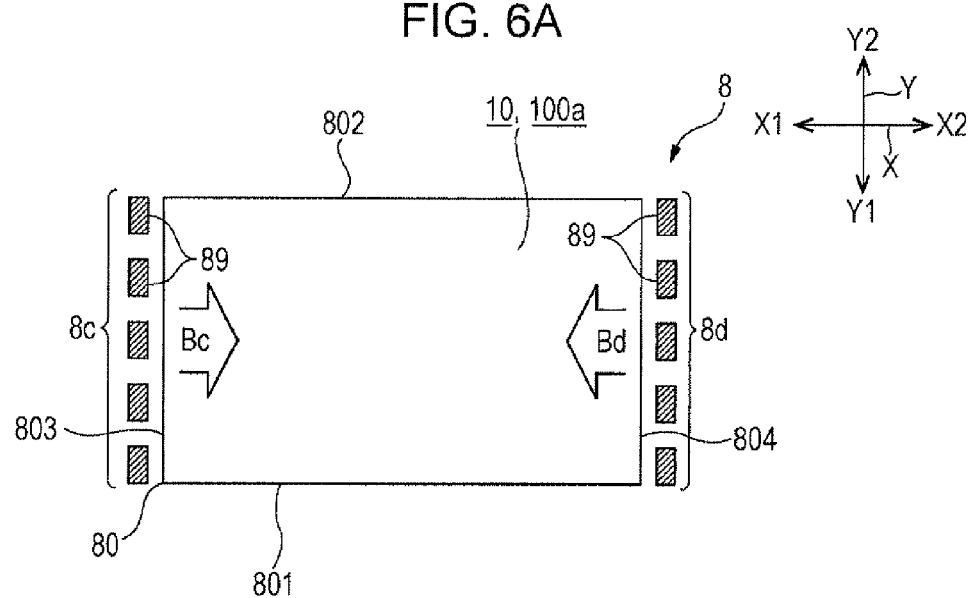
FIGS. 6A and 6B are explanatory diagrams which illustrate lighting patterns of light emitting elements in a liquid crystal display device according to a third embodiment of the invention.
Figure 6B:
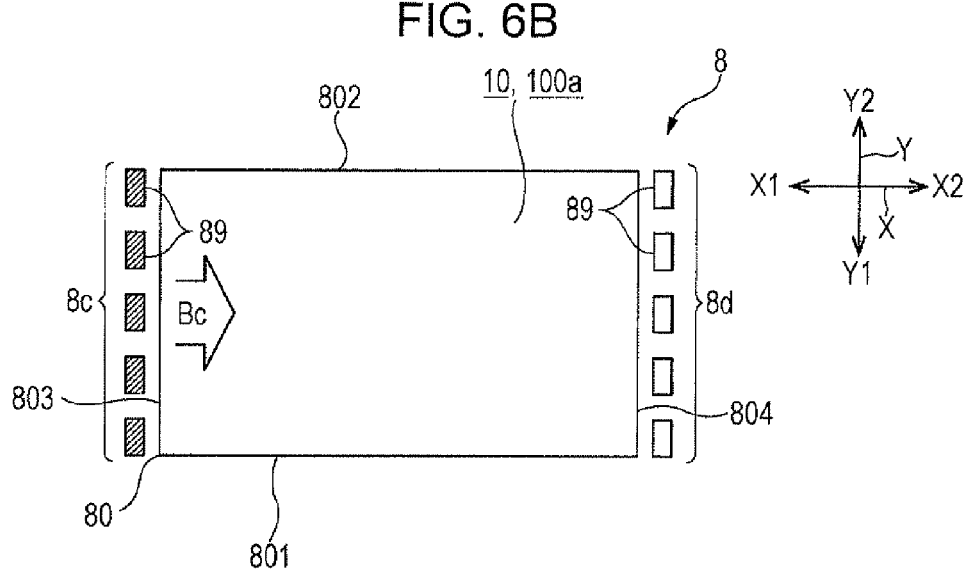

FIGS. 6A and 6B are explanatory diagrams which illustrate lighting patterns of light emitting elements 89 in a liquid crystal display device 100 according to a third embodiment of the invention. FIG. 6A is an explanatory diagram which illustrates an ON state of the light emitting elements 89 in a 3D mode, and FIG. 6B is an explanatory diagram which illustrates an ON state of the light emitting elements 89 in a 2D mode, respectively. In addition, since a basic configuration according to the embodiment is the same as that in the first embodiment, shared portions are given the same reference numerals, and descriptions thereof will be omitted. In addition, in FIGS. 6A and 6B, light emitting elements 89 which are turned on are denoted by slanted lines.

As illustrated in FIGS. 6A and 6B, according to the embodiment, the light emitting elements 89 (light emitting element rows 8c and 8d) are arranged along the side surfaces 803 and 804 facing in one direction (X axis direction) in the light guiding plate 80. Here, the light emitting elements 89 (light emitting element row 8c) arranging along the side surface 803 are the first light emitting elements (first light emitting element row), and the light emitting elements 89 (light emitting element row 8d) arranging along the side surface 804 are the second light emitting elements (second light emitting element row). Accordingly, in the 3D mode, the first light emitting elements (light emitting element row 8c) and the second light emitting elements (light emitting element row 8d) are intermittently turned on. In contrast to this, in the 2D mode, the first light emitting elements (light emitting element row 8c) are continuously turned on, and the second light emitting elements (light emitting element row 8d) are turned off.

For this reason, according to the embodiment, it is also possible to compress the difference in brightness between the 3D image and the 2D image, similarly to the first embodiment. In addition, since a control of the light emitting elements 89 is performed in each row (each light emitting element row) in the 2D mode, a turned off light emitting element 89 is not present between the light emitting elements 89 which are turned on. Accordingly, it is possible to suppress a deterioration in an image quality in the 28 mode, since distribution of an intensity of light which is input to the liquid crystal panel 10 from the light guiding plate 80 does not deteriorate.

Modification Example of Third Embodiment

Figure 7A:
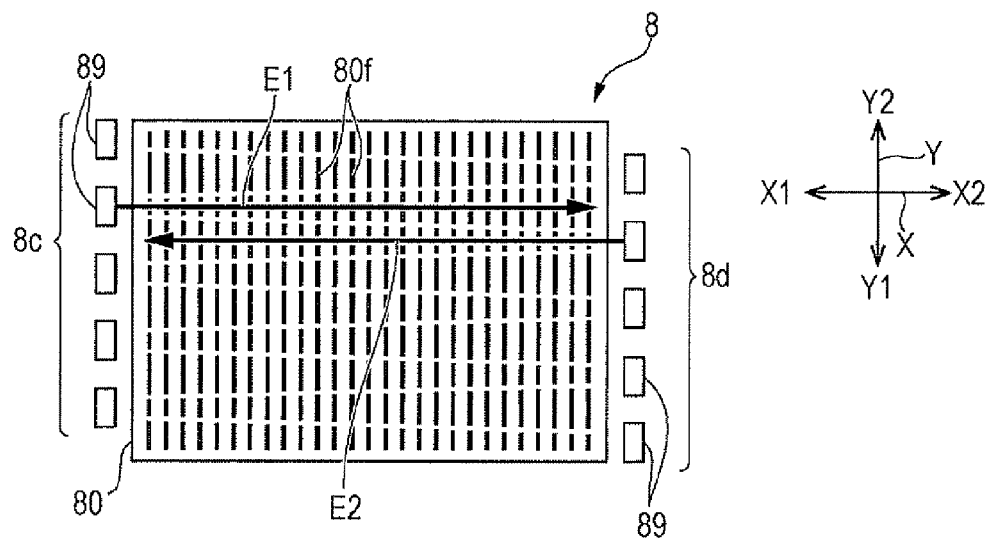
FIGS. 7A and 7B are explanatory diagrams which illustrate modification examples of a light guiding plate using the liquid crystal display device according to the third embodiment of the invention.
Figure 7B:
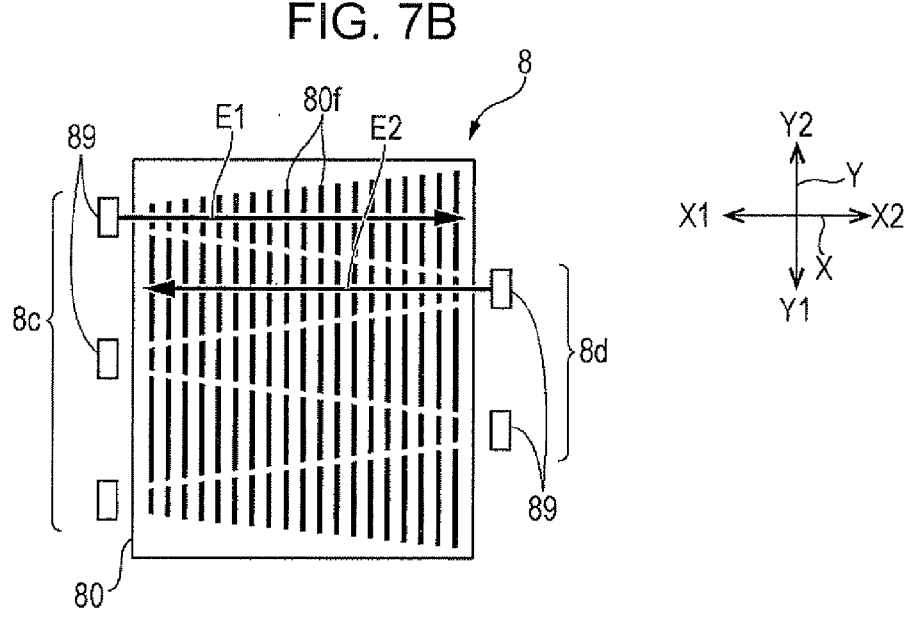

FIGS. 7A and 7B are explanatory diagrams which illustrate a modification example of a light guiding plate 80 which is used in the liquid crystal display device 100 according to the third embodiment of the invention. FIG. 7A is an explanatory diagram which schematically illustrates a diffusing pattern formed in the light guiding plate 80, and FIG. 7B is an explanatory diagram which schematically illustrates the diffusing pattern by enlarging thereof, respectively. In addition, since a basic configuration according to the embodiment is the same as those in the first and third embodiments, shared portions are given the same reference numerals, and descriptions thereof will be omitted.

According to the third embodiment, when a diffusing pattern in which a diffusing degree is increased toward the direction separated from the light emitting element row 8d is provided in order to improve a uniformity in luminance distribution due to input light from the light emitting element row 8d side, with respect to the light guiding plate 80, the diffusing degree of the diffusing pattern is decreased at a position which is close to the light emitting element row 8d side with respect to the input light from the light emitting element row 8c. In addition, when a diffusing pattern in which a diffusing degree is increased toward the direction separated from the light emitting element row 8*c* is provided with respect to the light guiding plate 80 in order to improve a uniformity in luminance distribution due to input light from the light emitting element row 8*c* side, the diffusing degree of the diffusing pattern is decreased at a position which is close to the light emitting element row 8*c* side with respect to the input light from the light emitting element row 8*d*. As a result, there is a concern that the luminance distribution may be deteriorate in the 2D mode.

Therefore, according to the embodiment, first, in the plurality of first light emitting elements (light emitting element row 8*c*) and the plurality of second light emitting elements (light emitting element row 8*d*), a first output light axis E1 of the light emitting elements 89 on the plurality of first light emitting elements side, and a second output light axis E2 of the light emitting elements 89 on the plurality of second light emitting elements side which are facing each other by interposing the light guiding plate 80 therebetween are deviated in the extending direction (Y axis direction) of the side surfaces 803 and 804 on which the light emitting elements 89 are arranged.

In addition, in the light guiding plate 80, diffusing patterns 80*f* are formed in a region in which the diffusing pattern overlaps with the first output light axis E1 in a planar view, and in a region in which the diffusing pattern overlaps with the second output light axis E2 in a planar view, respectively. Here, the diffusing patterns 80*f* are slit-shaped grooves or the like, and when a dimension in the direction in which the first output light axis E1 and the second output light axis E2 are crossed is large, a diffusing degree becomes large. Accordingly, according to the embodiment, in the light guiding plate 80, a diffusing pattern 80*f* of which a diffusing degree is increased toward a position separating from a position which is close to the light emitting elements 89 on the first light emitting elements (light emitting element row 8*c*) side is formed in a region in which the diffusing pattern overlaps with the first output light axis E1 in a planar view, and a diffusing pattern 80*f* of which a diffusing degree is increased toward a position separating from a position which is close to the light emitting elements 89 on the plurality of second light emitting elements (light emitting element row 8*d*) side is formed in a region in which the diffusing pattern overlaps with the second output light axis E2 in a planar view. For this reason, in the 2D mode, it is possible to make the luminance distribution appropriate, even when the first light emitting elements (light emitting element row 8*c*) among the plurality of first light emitting elements (light emitting element row 8*c*) and the plurality of second light emitting elements (light emitting element row 8*d*) which faces each other by interposing the light guiding plate 80 therebetween are turned on, and the second light emitting elements (light emitting element row 8*d*) are turned off.

Modification Example of Third Embodiment

In the above described third embodiment and the modification example, the light emitting elements 89 (light emitting element row 8*c*) which are arranged along the side surface 803, and the light emitting elements 89 (light emitting element row 8*d*) which are arranged along the side surface 804 are used, however, it may be set such that one of the light emitting elements 89 (light emitting element row 8*a*) which are arranged along the side surface 801, and the light emitting elements 89 (light emitting element row 8*b*) which are arranged along the side surface 802 is set to the first light emitting element row, and the other is set to the second light emitting element row.

Fourth Embodiment

Figure 8A:
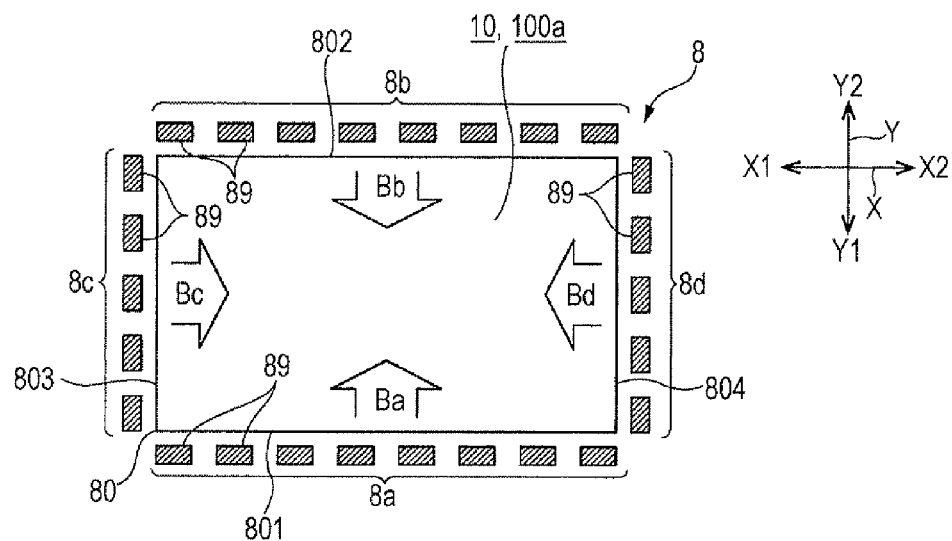
FIGS. 8A and 8B are explanatory diagrams which illustrate lighting patterns of light emitting elements in a liquid crystal display device according to a fourth embodiment of the invention.
Figure 8B:
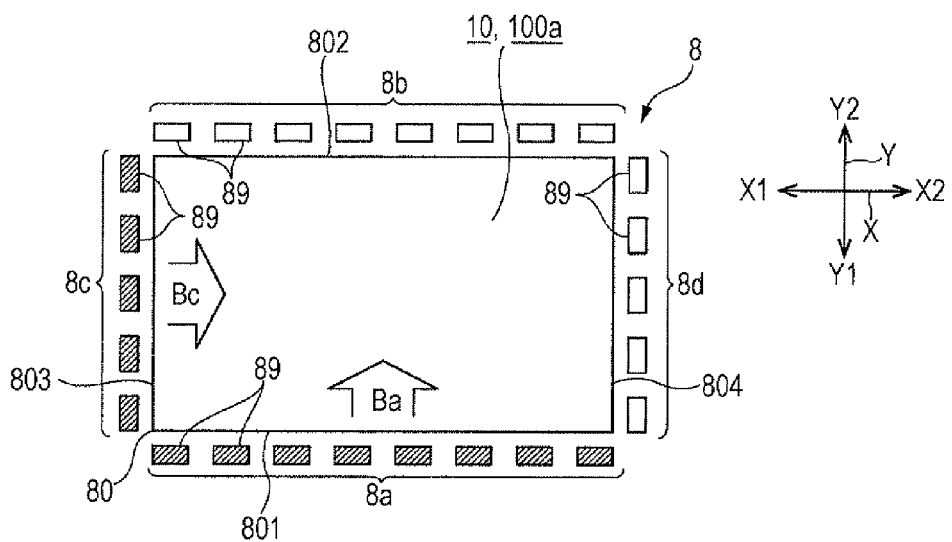

FIGS. 8A and 8B are explanatory diagrams which illustrate lighting patterns of a light emitting elements 89 in an liquid crystal display device 100 according to a fourth embodiment. FIG. 8A is an explanatory diagram which illustrates a ON state of the light emitting elements 89 in a 3D mode, and FIG. 8B is an explanatory diagram which illustrates an ON state of the light emitting elements 89 in a 2D mode, respectively. In addition, since a basic configuration according to the embodiment is the same as that in the first embodiment, shared portions are given the same reference numerals, and descriptions thereof will be omitted. In addition, in FIGS. 8A and 8B, light emitting elements 89 which are turned on are denoted by slanted lines.

As illustrated in FIGS. 8A and 8B, according to the embodiment, light emitting elements 89 (light emitting element rows 8*a* and 8*b*) are arranged along a first set of side surfaces 801 and 802 facing in one direction (Y axis direction) in a light guiding plate 80, and light emitting elements 89 (light emitting element rows 8*c* and 8*d*) are arranged along a second set of side surfaces 803 and 804 facing in the other direction (X axis direction) in the light guiding plate 80. Here, the light emitting elements 89 which are arranged along the one side surface in the first set of side surfaces 801 and 802, and the light emitting elements 89 which are arranged along the one side surface in the second set of side surfaces 803 and 804 are the first light emitting elements (first light emitting element row). In addition, the light emitting elements 89 which are arranged along the other side surface in the first set of side surfaces 801 and 802, and the light emitting elements 89 which are arranged along the other side surface in the second set of side surfaces 803 and 804 are the second light emitting elements (second light emitting element row). More specifically, the light emitting elements 89 which are arranged along the side surface 801 (light emitting element row 8*a*), and the light emitting elements 89 which are arranged along the side surface 803 (light emitting row 8*c*) are the first light emitting elements, and the light emitting elements 89 which are arranged along the side surface 802 (light emitting element row 8*b*), and the light emitting elements 89 which are arranged along the side surface 804 (light emitting element row 8*d*) are the second light emitting elements. Accordingly, in a 3D mode, the first light emitting elements (light emitting element rows 8*a* and 8*c*), and the second light emitting elements (light emitting element rows 8*b* and 8*d*) are intermittently turned on. In contrast to this, in a 2D mode, the first light emitting elements (light emitting element rows 8*a* and 8*c*), are continuously turned on, and the second light emitting elements (light emitting element rows 8*b* and 8*d*) are turned off.

For this reason, according to the embodiment, it is also possible to compress a difference in brightness between the 3D mode and the 2D mode, similarly to the first embodiment. In addition, since a control of the light emitting elements 89 is performed in each row (each light emitting element row) in the 2D mode, a turned off light emitting element 89 is not present between the light emitting elements 89 which are turned on. Accordingly, it is possible to suppress a deterioration in an image quality in the 2D mode, since distribution of an intensity of light which is input to the liquid crystal panel 10 from the light guiding plate 80 does not deteriorate.

Modification Example of Fourth Embodiment

Figure 9:
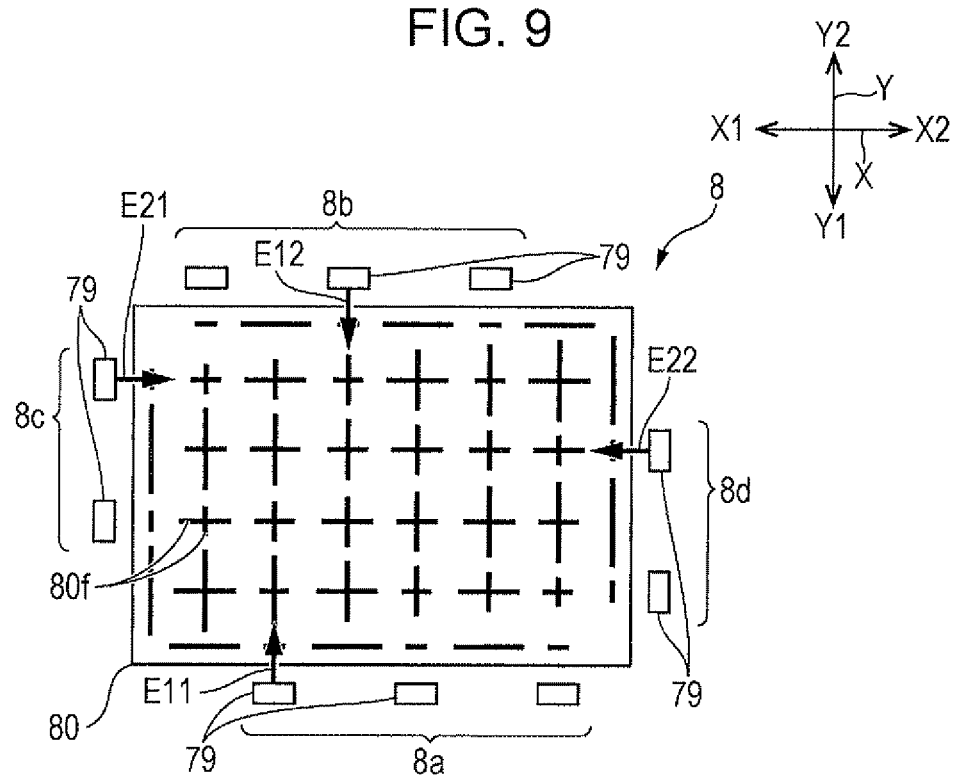
FIG. 9 is an explanatory diagram which illustrates a modification example of a light guiding plate used in the liquid crystal display device according to the fourth embodiment of the invention.

FIG. 9 is an explanatory diagram which illustrates a modification example of the light guiding plate 80 used in the liquid crystal display device 100 according to the fourth embodiment of the invention, and schematically illustrates a diffusing pattern by enlarging thereof. In addition, since a basic configuration according to the embodiment is the same as that in the first and fourth embodiments, shared portions are given the same reference numerals, and descriptions thereof will be omitted.

According to the fourth embodiment, when a diffusing pattern in which a diffusing degree is increased toward the direction separated from the light emitting element row 8a is provided in order to improve a uniformity in luminance distribution due to input light from the light emitting element row 8a side, with respect to the light guiding plate 80, the diffusing degree of the diffusing pattern is decreased at a position which is close to the light emitting element row 8a side with respect to the input light from the light emitting element row 8b. In addition, when a diffusing pattern in which a diffusing degree is increased toward the direction separated from the light emitting element row 8c is provided in order to improve a uniformity in luminance distribution due to input light from the light emitting element row 8c side, the diffusing degree of the diffusing pattern is decreased at a position which is close to the light emitting element row 8c with respect to the input light from the light emitting element row 8d. As a result, there is a concern that the luminance distribution may be deteriorate in the 3D mode.

Therefore, according to the embodiment, first, in the plurality of first light emitting elements (light emitting element row 8a) and the plurality of second light emitting elements (light emitting element row 8b), a first output light axis E11 of the light emitting elements 89 on the plurality of first light emitting elements side, and a second output light axis E12 of the light emitting elements 89 on the plurality of second light emitting elements side facing each other by interposing the light guiding plate 80 therebetween are deviated in the extending direction of the side surfaces 801 and 802 on which the light emitting elements 89 are arranged.

In addition, in the light guiding plate 80, diffusing patterns 80f are formed in a region in which the diffusing pattern overlaps with the first output light axis E11 in a planar view, and in a region in which the diffusing pattern overlaps with the second output light axis E12 in a planar view, respectively. Here, the diffusing patterns 80f are slit-shaped grooves or the like, and when a dimension in the direction in which the first output light axis E11 and the second output light axis E12 are crossed is large, a diffusing degree becomes large. Accordingly, according to the embodiment, in the light guiding plate 80, a diffusing pattern 80f of which a diffusing degree is increased toward a position separating from a position which is close to the light emitting elements 89 on the plurality of first light emitting elements (light emitting element row 8a) side is formed in a region in which the diffusing pattern overlaps with the first output light axis E11 in a planar view, and a diffusing pattern 80f of which a diffusing degree is increased toward a position separating from a position which is close to the light emitting elements 89 on the plurality of second light emitting elements (light emitting element row 8b) side is formed in a region in which the diffusing pattern overlaps with the second output light axis E12 in a planar view.

In addition, in the plurality of first light emitting elements (light emitting element row 8c), and the plurality of second light emitting elements (light emitting element row 8d), a first output light axis E21 of the light emitting elements 89 on the plurality of first light emitting elements side, and a second output light axis E22 of the light emitting elements 89 on the plurality of second light emitting elements side which are facing each other by interposing the light guiding plate 80 therebetween are deviated in the extending direction of the side surfaces 803 and 804 on which the light emitting elements 89 are arranged.

In addition, in the light guiding plate 80, diffusing patterns 80f are formed in a region in which the diffusing pattern overlaps with the first output light axis E21 in a planar view, and in a region in which the diffusing pattern overlaps with the second output light axis E22 in a planar view, respectively. Here, the diffusing patterns 80f are slit shaped grooves, or the like, and when a dimension in the direction in which the first output light axis E21 and the second output light axis E22 are crossed is large, a diffusing degree becomes large. Accordingly, according to the embodiment, a diffusing pattern 80f of which a diffusing degree is increased toward a position separating from a position which is close to the light emitting elements 89 on the plurality of first light emitting elements (light emitting element row 8c) side is formed in a region in which the diffusing pattern overlaps with the first output light axis E21 in a planar view, and a diffusing pattern 80f of which a diffusing degree is increased toward a position separating from a position which is close to the light emitting elements 89 on the plurality of second light emitting elements (light emitting element row 8d) side is formed in a region in which the diffusing pattern overlaps with the second output light axis E22 in a planar view.

For this reason, in the 2D mode, it is possible to make the luminance distribution appropriate, even when the first light emitting elements (light emitting element row 8a) among the plurality of first light emitting elements (light emitting element row 8a) and the plurality of second light emitting elements (light emitting element row 8b) which are facing each other by interposing the light guiding plate 80 therebetween are turned on, and the second light emitting elements (light emitting element row 8b) are turned off. In addition, in the 3D mode, it is possible to make the luminance distribution appropriate, even when the plurality of first light emitting elements (light emitting element row 8a), and the plurality of second light emitting elements (light emitting element row 8b) which are facing each other by interposing the light guiding plate 80 therebetween are turned on. In addition, in the 2D mode, it is possible to make the luminance distribution appropriate, even when the first light emitting elements (light emitting element row 8c) among the plurality of first light emitting elements (light emitting element row 8c) and the plurality of second light emitting elements (light emitting element row 8d) which are facing each other by interposing the light guiding plate 80 therebetween are turned on, and the second light emitting elements (light emitting element row 8d) are turned off. In addition, in the 3D mode, it is possible to make the luminance distribution appropriate, even when the plurality of first light emitting elements (light emitting element row 8c), and the plurality of second light emitting elements (light emitting element row 8d) which are facing each other by interposing the light guiding plate 80 therebetween are turned on.

Other Embodiment

According to the above embodiment, the number of first light emitting element rows (number of groups) which are turned on in the 2D mode, and the number of second light emitting element rows (number of groups) which are turned off in the 2D mode are the same, however, it may be a configuration in which the number of first light emitting element rows (number of groups) which are turned on in the 2D mode, and the number of second light emitting element rows (number of groups) which are turned off in the 2D mode are different from each other. Specifically, it is possible to set the first light emitting element row which is turned on in the 2D mode to the light emitting element row 8a which is arranged along the side surface 801, and to set the second light emitting element row which is turned off to the light emitting element rows 8b, 8c and 8d which are arranged along the side surfaces 802, 803, and 804. In this manner, it is possible to further compress the difference in brightness between the 3D image and the 2D image. In addition, it is also possible to set the first light emitting element row which is turned on in the 2D mode to the light emitting element row 8b which is arranged along the side surface 802, and to set the second light emitting element row which is turned off to the light emitting element rows 8a, 8c and 8d which are arranged along the side surfaces 801, 803, and 804. In addition, it is also possible to set the first light emitting element row which is turned on in the 2D mode to the light emitting element row 8a which is arranged along the side surface 801, and to set the second light emitting element row which is turned off to the light emitting element rows 8c and 8d which are arranged along the side surfaces 803 and 804. In this case, the light emitting element row is not arranged on the side surface 802 side.

In addition, according to the above embodiment, a light emitting intensity in each light emitting element 89 in the first light emitting element row, and a light emitting intensity in each light emitting element 89 in the second light emitting element row are the same, however, it may be a configuration in which a light emitting intensity in each light emitting element 89 in the first light emitting element row, and a light emitting intensity in each light emitting element 89 in the second light emitting element row are different from each other. Specifically, in the liquid crystal display device which is used in the first embodiment, it is possible to use a light emitting element of which light emitting brightness is higher than that in the first light emitting elements which are arranged along the side surfaces 801 and 802, as the second light emitting elements which are arranged along the side surfaces 803 and 804. In this manner, it is possible to further compress the difference in brightness between the 3D image and the 2D image. In addition, it is also possible to use a light emitting element of which light emitting brightness is higher than that in the second light emitting elements which are arranged along the side surfaces 803 and 804, as the first light emitting elements which are arranged along the side surfaces 801 and 802. In this case, it is possible to display a bright 2D image while compressing the difference in brightness between the 3D image and the 2D image.

In addition, it is possible to obtain the same effect when changing a packaging density of the light emitting element in the first light emitting element row and the second light emitting element row, without changing brightness of the light emitting element.

According to the above embodiment, the second light emitting elements are turned off in the 2D mode, however, a configuration may be adopted in which the second light emitting elements are turned on with light emitting intensities which are lower than those in the 3D mode.

According to the above embodiment, the light emitting intensities of the first light emitting element row in the 2D mode and the 3D mode are the same, however, the light intensity in the first light emitting element row can be reduced in the 2D mode. In that case, it is necessary to perform reducing of the light intensity in each light emitting element row. In addition, in this case, the second light emitting elements emit light with the same light emitting intensity as those in the first light emitting elements when displaying the 3D image, however, the second light emitting elements are turned off when displaying the 2D image. It is possible to suppress a deterioration in an image quality in the 2D mode, since distribution of intensity of light which is input to the liquid crystal panel from the light guiding plate does not deteriorate by performing uniform reducing of light intensity of the first light emitting element row in all of the first light emitting elements.

Other Embodiments of First and Second Modes

According to the above embodiment, a case has been exemplified in which a 3D mode (first mode) in which the left eye image (first image) and the right eye image (second image) for a 3D image are displayed by giving a time difference is executed, and a 2D mode (second mode) in which a 2D image is displayed without being divided based on the time the images are captured or optically is executed, however, the embodiment of the invention may be applied to a liquid crystal display device with which a plurality of persons can view different 2D images. More specifically, in FIGS. 10A to 10C, each of a left eye image (L) and a right eye image (R) corresponds to a first image which is viewed to a specific person, and a second image which is viewed to another person, respectively. In this case, for a person who views the second image, shutters in shutter glasses in both eyes become a transmission state in a period of time t1 to t2, and become a light shielding state in other periods of time. In contrast to this, for a person who views the first image, the shutter glasses become a transmission state in a period of time t3 to t4 in both eyes, and become a light shielding state in other periods of time. In addition, when a plurality of persons view the same 2D images, it is not necessary to wear the shutter glasses, or the shutter glasses become the transmission state in both eyes in the whole period.

In addition, according to the above embodiment, in the 3D mode (first mode), the first and second images are displayed by giving a time difference, however, the first and second images may be displayed on an image display area 100a at the same time by being optically divided. For example, plates of ¼λ of which optical axes are different by 90 degrees are arranged on the outer side of a polarizing plate in each pixel row corresponding to scanning lines of odd numbers and even numbers, and for example, a right eye image (first image) is set to left-hand circular polarized light, and a left eye image (second image) is set to right-hand circular polarized light. In this case, glasses in which the plates of ¼λ are attached to both eyes on the outer side of the polarizing plate are used. In this manner, for example, the right eye views an image displayed using a pixel row (plurality of first pixels) corresponding to the odd number scanning lines, and the left eye views an image displayed using a pixel row (plurality of second pixels) corresponding to the odd number scanning lines.

Example of Mounting on Electronic Apparatus

According to the above described embodiment, as the electronic apparatus 2000 on which the liquid crystal display device 100 is mounted, a liquid crystal television has been exemplified, however, the invention may be applied to a liquid crystal display device 100 which is used in a display unit of an electronic apparatus such as a display of a personal computer, a digital signage, a car navigation, and a mobile information terminal, in addition to the liquid crystal television.

The entire disclosure of Japanese Patent Application No. 2012-170878, filed Aug. 1, 2012 is expressly incorporated by reference herein.

What is claimed is:

1. A display device comprising:
an optical panel including an image display area;
a backlight unit including a light guiding plate, which is disposed to be overlapped to the optical panel, and light sources which are arranged at a plurality of side surfaces of the light guiding plate;
a first mode in which a first image and a second image which are divided based on the time or optically each other are displayed in the image display area; and
a second mode which a third image is displayed without being divided based on the time or optically in the image display area,
wherein the light sources include a first light emitting element row which disposed along a first side surface among the plurality of the side surfaces, a second light emitting element row which disposed along a second side surface which is different from the first side surface among the plurality of the side surfaces, a third light emitting element row which disposed along a third side surface facing the first side surface and a fourth light emitting element row which disposed along a fourth side surface facing the second side surface, and
wherein a second average of light emitting intensity of the light sources in the second mode is lower than a first average of light emitting intensity of the light sources in the first mode by controlling at least the light emitting intensities of the second light emitting element row and the fourth light emitting element row.

2. The display device according to claim 1,
wherein a first light emitting intensities of the first light emitting element row and the third light emitting element row are set to be the same as those in the first mode, and a second light emitting intensities of the second light emitting element row and the fourth light emitting element row are set to be lower than those in the first mode, in the second mode.

3. The display device according to claim 2,
wherein the second light emitting element row and the fourth light emitting element row are set to be an OFF state in the second mode.

4. The display device according to claim 1,
wherein in the first mode, a first image display period in which the first image is displayed in the image display area, a first transitional period in which a display in the image display area is rewritten from the first image to the second image, a second image display period in which the second image is displayed in the image display area, and a second transitional period in which a display in the image display area is rewritten from the second image to the first image are performed in order, and the first light emitting element row, the second light emitting element row, the third light emitting element row and the fourth light emitting element row are turned on in the first image display period and the second image display period, and the first light emitting element row, the second light emitting element row, the third light emitting element row, and the fourth light emitting element row are turned off in the first transitional period and the second transitional period.

5. The display device according to claim 1,
wherein the image display area has a plurality of first pixels and a plurality of second pixels which are divided from the plurality of the first pixels, the first image is displayed using a first polarization light and the plurality of the first pixels, and the second image is displayed using a second polarization light and the plurality of the second pixels in the first mode.

6. An electronic apparatus comprising:
the display device according to claim 1.

7. A display device comprising:
an optical panel including an image display area;
a backlight unit including a light guiding plate, which is disposed to be overlapped to the optical panel, includes a first through a fourth side surfaces and a first through a fourth light emitting element rows, the first side surface is opposite to the third side surface, the second side surface is positioned between the first side surface and the third side surface and opposite to the fourth side surface, the first light emitting element row includes a plurality of first light emitting elements and is disposed along the first side surface, the second light emitting element row includes a plurality of second light emitting elements and is disposed along the second side surface, the third light emitting element row includes a plurality of third light emitting elements and is disposed along the third side surface and the fourth light emitting element row includes a plurality of fourth light emitting elements and is disposed along the fourth side surface;
a first mode in which a first image and a second image are displayed in the image display area alternately based on the time, the first image and the second image are different to each other; and
a second mode in which a third image is displayed continuously in the image display area,
wherein a first average of light emitting intensity of the plurality of second light emitting elements and the plurality of fourth light emitting elements in the first mode,
a second average of light emitting intensity of the plurality of second light emitting elements and the plurality of fourth light emitting elements in the second mode, and
the second average is lower than the first average.

8. The display device according to claim 7,
wherein a third average of light emitting intensity of the plurality of first light emitting elements and the plurality of third light emitting elements in the first mode,
a fourth average of light emitting intensity of the plurality of first light emitting elements and the plurality of third light emitting elements in the second mode, and
the third average is set to be the same as the fourth average.

9. The display device according to claim 7,
wherein the plurality of second light emitting elements and the plurality of fourth light emitting elements are set to be an OFF state in the second mode.

10. The display device according to claim 7,
wherein in the first mode, a first image display period in which the first image is displayed in the image display area, a first transitional period in which a display in the image display area is rewritten from the first image to the second image, a second image display period in which the second image is displayed in the image display area, and a second transitional period in which a display in the image display area is rewritten from the second image to the first image are performed in order, and the plurality of first light emitting elements, the plurality of second light emitting elements, the plurality of third light emitting elements and the plurality of fourth light emitting elements are turned on in the first image display period and the second image display period, and the plurality of first light emitting elements, the plurality of second light emitting elements, the plurality of third light emitting elements and the plurality of fourth light emitting elements are turned off in the first transitional period and the second transitional period.

11. An electronic apparatus comprising:
the display device according to claim 7.

12. A display device comprising:
an optical panel including an image display area;
a backlight unit including a light guiding plate, which is disposed to be overlapped to the optical panel, includes a first through a fourth side surfaces and a first through a fourth light emitting element rows, the first side surface is opposite to the third side surface, the second side surface is positioned between the first side surface and the third side surface and opposite to the fourth side surface, the first light emitting element row includes a plurality of first light emitting elements and is disposed along the first side surface, the second light emitting element row includes a plurality of second light emitting elements and is disposed along the second side surface, the third light emitting element row includes a plurality of third light emitting elements and is disposed along the third side surface and the fourth light emitting element row includes a plurality of fourth light emitting elements and is disposed along the fourth side surface;
a first mode in which a first image is displayed using a first polarization light and a second image is displayed using a second polarization light in the image display area, the first image and the second image are different to each other; and
a second mode in which a third image is displayed using a third polarization light in the image display area, wherein a first average of light emitting intensity of the plurality of second light emitting elements and the plurality of fourth light emitting elements in the first mode,
a second average of light emitting intensity of the plurality of second light emitting elements and the plurality of fourth light emitting elements in the second mode, and
the second average is lower than the first average.

13. The display device according to claim 12,
wherein a third average of light emitting intensity of the plurality of first light emitting elements and the plurality of third light emitting elements in the first mode,
a fourth average of light emitting intensity of the plurality of first light emitting elements and the plurality of third light emitting elements in the second mode, and
the third average is set to be the same as the fourth average.

14. The display device according to claim 12,
wherein the plurality of second light emitting elements and the plurality of fourth light emitting elements are set to be an OFF state in the second mode.

15. The display device according to claim 12,
wherein the image display area has a plurality of first pixels and a plurality of second pixels which are divided from the plurality of the first pixels, the first image is displayed using the first polarization light and the plurality of the first pixels, and the second image is displayed using the second polarization light and the plurality of the second pixels in the first mode.

16. The display device according to claim 12,
wherein the third image is displayed using the third polarization light and a fourth polarization light, and
the third polarization light is same as the first polarization light and the fourth polarization light is same as the second polarization light.

17. An electronic apparatus comprising:
the display device according to claim 12.

* * * * *